(12) United States Patent
Okoniewska et al.

(10) Patent No.: US 10,306,897 B2
(45) Date of Patent: Jun. 4, 2019

(54) BREAKFAST BISCUIT WITH SLOWLY AVAILABLE GLUCOSE

(75) Inventors: Monika Okoniewska, Princeton, NJ (US); James A. Schulok, Garnerville, NY (US); Tiffany Sepanski, Woodbridge, NJ (US); Olivia Nnadi, Boston, MA (US); Juliette Folz, Antony (FR); Aliette Verel, Bievres (FR); Sophie Vinoy, Orsay (FR); Lionel Lanvin, Chilly Mazarin (FR); Agathe Arlotti, Paris (FR); Robin Wahl, Chevreuse (FR); Pierre Aymard, Antony (FR)

(73) Assignee: Generale Biscuit, Rungis (FR)

( * ) Notice: Subject to any disclaimer, the term of this patent is extended or adjusted under 35 U.S.C. 154(b) by 0 days.

(21) Appl. No.: 14/127,578

(22) PCT Filed: Jun. 20, 2012

(86) PCT No.: PCT/US2012/043303
§ 371 (c)(1),
(2), (4) Date: Jul. 16, 2014

(87) PCT Pub. No.: WO2012/155154
PCT Pub. Date: Nov. 15, 2012

(65) Prior Publication Data
US 2014/0356505 A1    Dec. 4, 2014

Related U.S. Application Data

(60) Provisional application No. 61/498,986, filed on Jun. 20, 2011.

(30) Foreign Application Priority Data

Jun. 20, 2011  (EP) .................................... 11290278
Jun. 20, 2011  (EP) .................................... 11290279

(51) Int. Cl.
A21D 8/02    (2006.01)
A21D 13/40   (2017.01)
(Continued)

(52) U.S. Cl.
CPC ................ A21D 8/02 (2013.01); A21C 5/003 (2013.01); A21D 2/186 (2013.01); A21D 8/06 (2013.01);
(Continued)

(58) Field of Classification Search
CPC ..... A21D 13/062; A21D 10/002; A21D 2/186
See application file for complete search history.

(56) References Cited

U.S. PATENT DOCUMENTS 3,050,017 A  8/1962  Mahler
4,229,487 A  10/1980  Crothers
(Continued)

FOREIGN PATENT DOCUMENTS

CA  1136921  12/1982
CA  2141974   8/1995
(Continued)

OTHER PUBLICATIONS

Zhang, Genyi. "Slowly Digestible State of Starch: Mechanism of Slow Digestion Property of Gelatinzed Maize Starch" J. Agric Food Chem. 2008, 56, 4695-4702. (Year: 2008).*
(Continued)

*Primary Examiner* — Katherine D Leblanc
(74) *Attorney, Agent, or Firm* — Morgan, Lewis & Bockius LLP

(57) ABSTRACT

Methods and products related to a baked cereal product having a pre-baked SA content and a post-baked SAG content, wherein the post-baked SAG content is less than about 25% below the pre-baked SAG content.

55 Claims, 6 Drawing Sheets

(51) Int. Cl.

| | | |
|---|---|---|
| *A21D 13/02* | (2006.01) | |
| *A21D 13/04* | (2017.01) | |
| *A21D 13/062* | (2017.01) | |
| *A21D 2/18* | (2006.01) | |
| *A21D 10/00* | (2006.01) | |
| *A21C 5/00* | (2006.01) | |
| *A21D 8/06* | (2006.01) | |
| *A23L 29/225* | (2016.01) | |
| *A23L 7/10* | (2016.01) | |
| *A21D 13/80* | (2017.01) | |
| *A21D 13/22* | (2017.01) | |
| *A21D 13/19* | (2017.01) | |

(52) U.S. Cl.
CPC ........... *A21D 10/002* (2013.01); *A21D 13/02* (2013.01); *A21D 13/04* (2013.01); *A21D 13/062* (2013.01); *A21D 13/19* (2017.01); *A21D 13/22* (2017.01); *A21D 13/40* (2017.01); *A21D 13/80* (2017.01); *A23L 7/115* (2016.08); *A23L 7/198* (2016.08); *A23L 29/225* (2016.08)

(56) References Cited

U.S. PATENT DOCUMENTS

| | | |
|---|---|---|
| 4,293,577 A | 10/1981 | Cillario |
| 4,563,363 A | 1/1986 | Yoon |
| 4,623,550 A * | 11/1986 | Willard .................. 426/559 |
| 4,894,246 A | 1/1990 | Dartey et al. |
| 4,961,937 A | 10/1990 | Rudel |
| 5,014,885 A | 5/1991 | Heep et al. |
| 5,015,488 A | 5/1991 | Van Lengerich et al. |
| 5,071,668 A | 12/1991 | Van Lengerich et al. |
| 5,286,513 A | 2/1994 | Fuisz |
| 5,356,644 A | 10/1994 | Hendrick et al. |
| 5,382,443 A | 1/1995 | Kincaid et al. |
| 5,389,395 A | 2/1995 | Joseph et al. |
| 5,419,903 A | 5/1995 | Evans et al. |
| 5,447,743 A | 9/1995 | Dvir et al. |
| 5,472,731 A | 12/1995 | Fuisz |
| 5,480,669 A | 1/1996 | Zallie et al. |
| 5,492,710 A | 2/1996 | Seyam |
| 5,573,793 A | 11/1996 | Saintain |
| 5,601,863 A | 2/1997 | Borden et al. |
| 5,603,975 A | 2/1997 | Fontana |
| 5,605,893 A | 2/1997 | Kaufman |
| 5,620,871 A | 4/1997 | Caboche |
| 5,624,684 A | 4/1997 | Fuisz |
| 5,659,000 A | 8/1997 | Cain et al. |
| 5,681,601 A | 10/1997 | Hendrick et al. |
| 5,688,548 A | 11/1997 | Gaither et al. |
| 5,709,896 A | 1/1998 | Hartigan et al. |
| 5,714,600 A | 2/1998 | McNaught et al. |
| 5,776,887 A | 7/1998 | Wilbert et al. |
| 5,843,921 A | 12/1998 | Kaufman |
| 5,849,090 A | 12/1998 | Haralampu et al. |
| 5,888,564 A | 3/1999 | Fontana |
| 5,906,852 A | 5/1999 | Klemann et al. |
| 5,932,269 A | 8/1999 | Huang et al. |
| 5,962,047 A | 10/1999 | Gross et al. |
| 6,001,399 A | 12/1999 | Kilibwa |
| 6,024,997 A | 2/2000 | Blaschke et al. |
| 6,043,229 A | 3/2000 | Kettlitz et al. |
| 6,048,564 A | 4/2000 | Young et al. |
| 6,090,594 A | 7/2000 | Kettlitz et al. |
| 6,103,279 A | 8/2000 | Ferrero |
| 6,110,511 A | 8/2000 | Rollins et al. |
| 6,139,884 A | 10/2000 | Shifferaw et al. |
| 6,149,965 A | 11/2000 | van Lengerich et al. |
| 6,165,524 A | 12/2000 | Narayanaswamy et al. |
| 6,197,361 B1 | 3/2001 | Anantharaman et al. |
| 6,214,402 B1 | 4/2001 | Fotos et al. |
| 6,217,930 B1 | 4/2001 | Kilibwa |
| 6,221,418 B1 | 4/2001 | Bergenfield et al. |
| 6,249,972 B1 | 6/2001 | Kennelly et al. |
| 6,280,782 B1 | 8/2001 | Hahn et al. |
| 6,299,916 B1 | 10/2001 | Dally et al. |
| 6,303,174 B1 | 10/2001 | McNaught et al. |
| 6,339,076 B1 | 1/2002 | Kaufman |
| 6,419,979 B1 | 1/2002 | Nelson et al. |
| 6,352,733 B1 | 3/2002 | Haynes et al. |
| 6,379,723 B1 | 4/2002 | Samuelsson |
| 6,451,121 B2 | 9/2002 | Chiu et al. |
| 6,451,367 B1 | 9/2002 | McNaught et al. |
| 6,458,405 B1 | 10/2002 | Roy et al. |
| 6,488,957 B1 | 12/2002 | Koumarianos |
| 6,534,487 B1 | 3/2003 | Kaufman |
| 6,537,599 B2 | 3/2003 | Taylor et al. |
| 6,558,718 B1 | 5/2003 | Evenson et al. |
| 6,569,483 B2 | 5/2003 | Zohoungbogbo |
| 6,613,373 B2 | 9/2003 | Haynes et al. |
| 6,623,943 B2 | 9/2003 | Schmiedel et al. |
| 6,664,389 B1 | 12/2003 | Shi et al. |
| 6,706,305 B2 | 3/2004 | Wolt et al. |
| 6,716,462 B2 | 4/2004 | Prosise et al. |
| 6,720,015 B2 | 4/2004 | Prosise et al. |
| 6,723,358 B1 | 4/2004 | van Lengerich |
| 6,726,943 B2 | 4/2004 | Prosise et al. |
| 6,733,769 B1 | 5/2004 | Ryan et al. |
| 6,759,070 B1 | 7/2004 | Narayanaswamy et al. |
| 6,808,733 B2 | 10/2004 | Barndt et al. |
| 6,821,547 B2 | 11/2004 | Shah et al. |
| 6,827,954 B2 | 12/2004 | Prosise et al. |
| 6,837,682 B2 | 1/2005 | Evenson et al. |
| 6,838,107 B1 | 1/2005 | Bakal et al. |
| 6,846,501 B2 | 1/2005 | Prosise et al. |
| 6,905,702 B1 | 6/2005 | Kaufman |
| 6,913,775 B2 | 7/2005 | Ballman et al. |
| 6,929,815 B2 | 8/2005 | Bengs et al. |
| 6,929,817 B2 | 8/2005 | Shi et al. |
| 6,942,885 B2 | 9/2005 | Ross et al. |
| 6,890,571 B2 | 10/2005 | Shi et al. |
| 6,984,407 B2 | 1/2006 | Wolt et al. |
| 7,074,445 B2 | 7/2006 | Barber et al. |
| 7,097,831 B1 | 8/2006 | Bengs et al. |
| 7,097,870 B2 | 8/2006 | Funk et al. |
| 7,138,154 B2 | 11/2006 | Brendel et al. |
| 7,166,313 B2 | 1/2007 | Diddle et al. |
| 7,169,417 B2 | 1/2007 | Dibble et al. |
| 7,189,288 B2 | 3/2007 | Stanley et al. |
| 7,201,923 B1 | 4/2007 | van Lengerich |
| 7,235,276 B2 | 6/2007 | Allen et al. |
| 7,252,847 B2 | 8/2007 | Keller et al. |
| 7,329,429 B2 | 2/2008 | Chimel et al. |
| 7,396,555 B2 | 7/2008 | Baumgartner et al. |
| 7,425,344 B2 | 9/2008 | Korolchuk et al. |
| 7,507,431 B2 | 3/2009 | Faa et al. |
| 7,531,199 B2 | 5/2009 | Haynes et al. |
| 7,585,536 B2 | 9/2009 | Silver |
| 7,592,026 B2 | 9/2009 | Hartmann et al. |
| 7,595,075 B2 | 9/2009 | Lang et al. |
| 7,595,081 B1 | 9/2009 | Bellar |
| 7,605,254 B2 | 10/2009 | McClain |
| 7,629,008 B2 | 12/2009 | Coleman et al. |
| 7,648,723 B2 | 1/2010 | Zimeri et al. |
| 7,700,139 B2 | 4/2010 | Bird et al. |
| 7,700,327 B2 | 4/2010 | King et al. |
| 7,704,535 B2 | 4/2010 | Zhang et al. |
| 7,727,975 B2 | 6/2010 | Chang et al. |
| 7,744,944 B2 | 6/2010 | Binder et al. |
| 7,812,004 B2 | 10/2010 | Frippiat et al. |
| 7,829,128 B2 | 11/2010 | Karwowski et al. |
| 7,867,533 B2 | 1/2011 | Bows et al. |
| 7,867,546 B2 | 1/2011 | Hirano et al. |
| 7,910,150 B2 | 3/2011 | Matsuda et al. |
| 7,919,134 B2 | 4/2011 | Froseth et al. |
| 7,927,640 B2 | 4/2011 | Lang et al. |
| 7,935,372 B2 | 5/2011 | Slegers et al. |
| 7,947,320 B2 | 5/2011 | Faa et al. |
| 7,959,962 B2 | 6/2011 | Hellwege et al. |
| 7,964,232 B2 | 6/2011 | Lee |
| 7,993,686 B2 | 8/2011 | Bird et al. |

(56) References Cited

U.S. PATENT DOCUMENTS

| | | |
|---|---|---|
| 8,017,172 B2 | 9/2011 | Arndt et al. |
| 8,057,833 B2 | 11/2011 | David et al. |
| 8,076,473 B2 | 12/2011 | Berckmans et al. |
| 8,080,273 B2 | 12/2011 | Lykomitros et al. |
| 8,088,431 B2 | 1/2012 | Ward et al. |
| 8,128,977 B2 | 3/2012 | Anfinsen et al. |
| 8,163,150 B2 | 4/2012 | Vann et al. |
| 8,163,324 B2 | 4/2012 | Zimeri et al. |
| 8,163,715 B2 | 4/2012 | Meuser et al. |
| 8,168,244 B2 | 5/2012 | Bashor |
| 8,193,341 B2 | 6/2012 | Meuser et al. |
| 8,221,808 B2 | 7/2012 | Lang et al. |
| 8,221,810 B2 | 7/2012 | Allen et al. |
| 8,227,448 B2 | 7/2012 | Van Laere et al. |
| 8,252,360 B2 | 8/2012 | Arndt et al. |
| 8,257,773 B2 | 9/2012 | Froseth et al. |
| 8,313,757 B2 | 11/2012 | van Lengerich |
| 8,354,134 B2 | 1/2013 | Atwell et al. |
| 8,361,532 B2 | 1/2013 | David et al. |
| 8,367,137 B2 | 2/2013 | Prakash et al. |
| 8,367,138 B2 | 2/2013 | Prakash et al. |
| 8,367,139 B2 | 2/2013 | Haynes et al. |
| 8,372,466 B2 | 2/2013 | Mingus et al. |
| 8,377,491 B2 | 2/2013 | Prakash et al. |
| 8,414,954 B2 | 4/2013 | Nowakowski et al. |
| 8,420,116 B2 | 4/2013 | Ivie et al. |
| 8,431,618 B2 | 4/2013 | Endo et al. |
| 8,435,587 B2 | 5/2013 | Prakash et al. |
| 8,435,588 B2 | 5/2013 | Prakash et al. |
| 8,465,785 B2 | 6/2013 | Anfinsen et al. |
| 8,470,149 B2 | 6/2013 | Vann et al. |
| 8,501,262 B2 | 8/2013 | Bird et al. |
| 8,512,777 B2 | 8/2013 | Fritzsching et al. |
| 8,512,789 B2 | 8/2013 | Prakash et al. |
| 8,524,303 B2 | 9/2013 | Prakash et al. |
| 8,524,304 B2 | 9/2013 | Prakash et al. |
| 8,535,588 B2 | 9/2013 | Sano et al. |
| 8,541,044 B1 | 9/2013 | Johnson et al. |
| 8,563,065 B2 | 10/2013 | Zimeri et al. |
| 8,568,820 B2 | 11/2013 | Stahl et al. |
| 8,580,327 B2 | 11/2013 | Cross et al. |
| 8,586,113 B2 | 11/2013 | Carder et al. |
| 8,591,919 B2 | 11/2013 | Stahl et al. |
| 8,597,704 B2 | 12/2013 | Bashor |
| 8,613,971 B2 | 12/2013 | Finocchiaro et al. |
| 8,617,635 B2 | 12/2013 | Hanselmann |
| 8,642,110 B2 | 2/2014 | Abrahamse et al. |
| 8,652,557 B2 | 2/2014 | Mingus et al. |
| 8,734,873 B2 | 5/2014 | Boice et al. |
| 8,741,370 B2 | 6/2014 | Ganjyal et al. |
| 8,759,645 B2 | 6/2014 | Frohberg et al. |
| 8,779,009 B2 | 7/2014 | Williams et al. |
| 8,790,740 B2 | 7/2014 | Nagahata et al. |
| 8,791,253 B2 | 7/2014 | Prakash et al. |
| 8,815,319 B2 | 8/2014 | Zapp Glauser et al. |
| 8,828,472 B2 | 9/2014 | Martinsen |
| 8,835,716 B2 | 9/2014 | Frohberg |
| 8,927,044 B2 | 1/2015 | Lopez et al. |
| 8,940,350 B2 | 1/2015 | Prakash et al. |
| 8,945,652 B2 | 2/2015 | Prakash et al. |
| 8,956,677 B2 | 2/2015 | Prakash et al. |
| 8,956,679 B2 | 2/2015 | Okoniewska et al. |
| 8,962,058 B2 | 2/2015 | Prakash et al. |
| 8,993,027 B2 | 3/2015 | Prakash et al. |
| 9,011,956 B2 | 4/2015 | Prakash et al. |
| 9,012,626 B2 | 4/2015 | Prakash et al. |
| 9,034,411 B2 | 5/2015 | Johnson et al. |
| 9,089,153 B2 | 7/2015 | Cross et al. |
| 9,101,160 B2 | 8/2015 | Prakash et al. |
| 2002/0119238 A1 | 8/2002 | Pires |
| 2002/0150649 A1 | 10/2002 | Bell |
| 2002/0197372 A1 | 12/2002 | Janssen et al. |
| 2002/0197373 A1 | 12/2002 | Shi et al. |
| 2003/0008039 A1 | 1/2003 | De Martinville et al. |
| 2003/0045504 A1 | 3/2003 | Brown et al. |
| 2003/0059458 A1 | 3/2003 | Haber et al. |
| 2003/0113429 A1 | 6/2003 | McNaught et al. |
| 2003/0138520 A1 | 7/2003 | Bell et al. |
| 2003/0143287 A1 | 7/2003 | Bell |
| 2003/0161816 A1 | 8/2003 | Fraser et al. |
| 2003/0161861 A1 | 8/2003 | Lang et al. |
| 2003/0170348 A1 | 9/2003 | Mihalos et al. |
| 2004/0022916 A1 | 2/2004 | Atwell et al. |
| 2004/0047950 A1 | 3/2004 | Gambino et al. |
| 2004/0048829 A1 | 3/2004 | Hausmanns et al. |
| 2004/0058050 A1 | 3/2004 | Guo |
| 2004/0058890 A1 | 3/2004 | Brown et al. |
| 2004/0109922 A1 | 6/2004 | Thai et al. |
| 2004/0137112 A1 | 7/2004 | Katz et al. |
| 2004/0185149 A1 | 9/2004 | Prosise et al. |
| 2004/0191393 A1 | 9/2004 | Sudha et al. |
| 2004/0197379 A1 | 10/2004 | Ryan et al. |
| 2004/0202772 A1 | 10/2004 | Matsuda et al. |
| 2004/0219280 A1 | 11/2004 | Green et al. |
| 2004/0234663 A1 | 11/2004 | Motoi et al. |
| 2004/0241313 A1 | 12/2004 | Nana et al. |
| 2004/0265360 A1 | 12/2004 | Venturi |
| 2005/0013900 A1 | 1/2005 | Dohl et al. |
| 2005/0031754 A1 | 2/2005 | Maningat et al. |
| 2005/0031755 A1 | 2/2005 | Maningat et al. |
| 2005/0031756 A1 | 2/2005 | Maningat et al. |
| 2005/0037125 A1 | 2/2005 | Maningat et al. |
| 2005/0058759 A1 | 3/2005 | Schmidt |
| 2005/0064080 A1 | 3/2005 | Creighton et al. |
| 2005/0079247 A1 | 4/2005 | Slilaty |
| 2005/0129823 A1 | 6/2005 | Dohl et al. |
| 2005/0186306 A1 | 8/2005 | Sonneveld et al. |
| 2005/0226960 A1 | 10/2005 | Boice et al. |
| 2005/0244910 A1 | 11/2005 | Wolever et al. |
| 2005/0260302 A1 | 11/2005 | Prosise |
| 2005/0271793 A1 | 12/2005 | Carmosino |
| 2005/0276896 A1 | 12/2005 | Sadek et al. |
| 2006/0013934 A1 | 1/2006 | Villagran et al. |
| 2006/0013940 A1 | 1/2006 | Mueller et al. |
| 2006/0034993 A1 | 2/2006 | Saelzer |
| 2006/0073240 A1 | 4/2006 | David et al. |
| 2006/0073258 A1 | 4/2006 | Korolchuk |
| 2006/0083795 A1 | 4/2006 | Shatkina et al. |
| 2006/0093720 A1 | 5/2006 | Tatz |
| 2006/0102477 A1 | 5/2006 | Vann et al. |
| 2006/0147500 A1 | 7/2006 | Klingeberg et al. |
| 2006/0159724 A1 | 7/2006 | Bell |
| 2006/0188631 A1 | 8/2006 | Woo et al. |
| 2006/0188644 A1 | 8/2006 | Sault et al. |
| 2006/0198936 A1 | 9/2006 | Manirath et al. |
| 2006/0210695 A1 | 9/2006 | Ganjyal et al. |
| 2006/0210696 A1 | 9/2006 | Liu et al. |
| 2006/0228461 A1 | 10/2006 | Morgan |
| 2006/0233846 A1 | 10/2006 | Morgan |
| 2006/0246198 A1 | 11/2006 | Mingus et al. |
| 2006/0257490 A1 | 11/2006 | Cremer et al. |
| 2006/0257977 A1 | 11/2006 | Hamaker et al. |
| 2006/0263503 A1 | 11/2006 | Okoniewska et al. |
| 2006/0286240 A1 | 12/2006 | Roosjen |
| 2006/0286248 A1 | 12/2006 | Anfinsen et al. |
| 2006/0286286 A1 | 12/2006 | Holzer et al. |
| 2007/0010480 A1 | 1/2007 | Rusing et al. |
| 2007/0042099 A1 | 2/2007 | Stanton |
| 2007/0042103 A1 | 2/2007 | Cho |
| 2007/0042104 A1 | 2/2007 | Cho |
| 2007/0042106 A1 | 2/2007 | Wagner et al. |
| 2007/0042107 A1 | 2/2007 | Kenneth et al. |
| 2007/0042992 A1 | 2/2007 | Frippiat et al. |
| 2007/0054024 A1 | 3/2007 | De Man |
| 2007/0059421 A1 | 3/2007 | Catani et al. |
| 2007/0065557 A1 | 3/2007 | Pandey et al. |
| 2007/0082029 A1 | 4/2007 | Aimutis et al. |
| 2007/0082030 A1 | 4/2007 | Aimutis et al. |
| 2007/0082092 A1 | 4/2007 | David et al. |
| 2007/0082104 A1 | 4/2007 | De Baets |
| 2007/0082109 A1 | 4/2007 | Muller et al. |
| 2007/0087107 A1 | 4/2007 | Borders et al. |
| 2007/0098865 A1 | 5/2007 | Hosokawa |
| 2007/0104855 A1 | 5/2007 | Arndt et al. |

(56) References Cited

U.S. PATENT DOCUMENTS

| | | |
|---|---|---|
| 2007/0110869 A1 | 5/2007 | Horstmann et al. |
| 2007/0110870 A1 | 5/2007 | Golaszewski et al. |
| 2007/0116800 A1 | 5/2007 | Prakash et al. |
| 2007/0116820 A1 | 5/2007 | Prakash et al. |
| 2007/0116821 A1 | 5/2007 | Prakash et al. |
| 2007/0116822 A1 | 5/2007 | Prakash et al. |
| 2007/0116823 A1 | 5/2007 | Prakash et al. |
| 2007/0116825 A1 | 5/2007 | Prakash et al. |
| 2007/0116827 A1 | 5/2007 | Prakash et al. |
| 2007/0116828 A1 | 5/2007 | Prakash et al. |
| 2007/0116829 A1 | 5/2007 | Prakash et al. |
| 2007/0116832 A1 | 5/2007 | Prakash et al. |
| 2007/0116833 A1 | 5/2007 | Prakash et al. |
| 2007/0116834 A1 | 5/2007 | Prakash et al. |
| 2007/0116836 A1 | 5/2007 | Prakash et al. |
| 2007/0116838 A1 | 5/2007 | Prakash et al. |
| 2007/0116839 A1 | 5/2007 | Prakash et al. |
| 2007/0116840 A1 | 5/2007 | Prakash et al. |
| 2007/0122529 A1 | 5/2007 | Thai et al. |
| 2007/0128311 A1 | 6/2007 | Prakash et al. |
| 2007/0128340 A1 | 6/2007 | Andrews et al. |
| 2007/0134391 A1 | 6/2007 | Prakash et al. |
| 2007/0134392 A1 | 6/2007 | Muller et al. |
| 2007/0141096 A1 | 6/2007 | Van Lengerich |
| 2007/0148324 A1 | 6/2007 | Lin et al. |
| 2007/0154609 A1 | 7/2007 | Ballwin et al. |
| 2007/0166446 A1 | 7/2007 | Boursier et al. |
| 2007/0178204 A1 | 8/2007 | Savul et al. |
| 2007/0196437 A1 | 9/2007 | Hansen et al. |
| 2007/0207240 A1 | 9/2007 | Hansen et al. |
| 2007/0207248 A1 | 9/2007 | Seneci |
| 2007/0212453 A1 | 9/2007 | Niness et al. |
| 2007/0212475 A1 | 9/2007 | Augustin et al. |
| 2007/0218167 A1 | 9/2007 | Bhatia et al. |
| 2007/0224321 A1 | 9/2007 | Prakash et al. |
| 2007/0269579 A1 | 11/2007 | Mingus et al. |
| 2007/0269580 A1 | 11/2007 | Werstak |
| 2007/0275147 A1 | 11/2007 | Prakash et al. |
| 2007/0292582 A1 | 12/2007 | Prakash et al. |
| 2007/0292583 A1* | 12/2007 | Haynes et al. ............. 426/549 |
| 2007/0298152 A1 | 12/2007 | De Baets |
| 2008/0003340 A1 | 1/2008 | Karwowski et al. |
| 2008/0020121 A1 | 1/2008 | Dohl et al. |
| 2008/0038442 A1 | 2/2008 | Peterson et al. |
| 2008/0050493 A1 | 2/2008 | Faa et al. |
| 2008/0057108 A1 | 3/2008 | Koyazounda et al. |
| 2008/0057157 A1* | 3/2008 | Almeida ................ A21D 2/00 426/20 |
| 2008/0085354 A1 | 4/2008 | Paeschke et al. |
| 2008/0089978 A1 | 4/2008 | Grigg et al. |
| 2008/0089981 A1 | 4/2008 | Butler et al. |
| 2008/0107779 A1 | 5/2008 | Kelvin |
| 2008/0124427 A1 | 5/2008 | Schafe et al. |
| 2008/0138472 A1 | 6/2008 | Alexandre |
| 2008/0152779 A1 | 6/2008 | De Groote et al. |
| 2008/0193596 A1 | 8/2008 | Hausmanns et al. |
| 2008/0206404 A1 | 8/2008 | Green et al. |
| 2008/0213456 A1 | 9/2008 | Chimel et al. |
| 2008/0226807 A1 | 9/2008 | Lotz et al. |
| 2008/0233260 A1 | 9/2008 | Woo et al. |
| 2008/0280003 A1 | 11/2008 | Coyle et al. |
| 2008/0286410 A1 | 11/2008 | Richmond et al. |
| 2008/0299258 A1 | 12/2008 | Roman et al. |
| 2008/0300400 A1 | 12/2008 | Berckmans et al. |
| 2008/0305223 A1 | 12/2008 | Cross et al. |
| 2008/0317932 A1 | 12/2008 | Long et al. |
| 2009/0011990 A1 | 1/2009 | Bouritius et al. |
| 2009/0017168 A1 | 1/2009 | Treece et al. |
| 2009/0029008 A1 | 1/2009 | Vanos et al. |
| 2009/0053379 A1 | 2/2009 | Kimura et al. |
| 2009/0123597 A1 | 5/2009 | Williams et al. |
| 2009/0148563 A1 | 6/2009 | Schuette et al. |
| 2009/0162499 A1 | 6/2009 | McArdle et al. |
| 2009/0169683 A1 | 7/2009 | Findlay |
| 2009/0202697 A1 | 8/2009 | Erickson et al. |
| 2009/0214718 A1 | 8/2009 | Leusner |
| 2009/0220649 A1 | 9/2009 | Ryan |
| 2009/0220654 A1 | 9/2009 | Kino et al. |
| 2009/0092706 A1 | 10/2009 | van der Hejden et al. |
| 2009/0246318 A1 | 10/2009 | Johansen |
| 2009/0252843 A1 | 10/2009 | Skinner |
| 2009/0269446 A1 | 10/2009 | Rabault et al. |
| 2009/0270337 A1 | 10/2009 | van Beckhoven et al. |
| 2009/0285944 A1 | 11/2009 | Rabault et al. |
| 2009/0285946 A1 | 11/2009 | Kirihara et al. |
| 2009/0317516 A1 | 12/2009 | Newsteder |
| 2010/0003370 A1 | 1/2010 | De Baets |
| 2010/0009044 A1 | 1/2010 | Halden et al. |
| 2010/0021609 A1 | 1/2010 | Mattson et al. |
| 2010/0027412 A1 | 2/2010 | Yang et al. |
| 2010/0034926 A1 | 2/2010 | Frick et al. |
| 2010/0034933 A1 | 2/2010 | Crawford et al. |
| 2010/0040736 A1 | 2/2010 | Van et al. |
| 2010/0092620 A1 | 4/2010 | Bravo et al. |
| 2010/0099864 A1 | 4/2010 | van der Maarel |
| 2010/0112174 A1 | 5/2010 | Christensen et al. |
| 2010/0137569 A1 | 6/2010 | Prakash et al. |
| 2010/0151105 A1 | 6/2010 | Kameo et al. |
| 2010/0189843 A1 | 7/2010 | Xie et al. |
| 2010/0189875 A1 | 7/2010 | Finocchiaro |
| 2010/0215825 A1 | 8/2010 | Boursier et al. |
| 2010/0215826 A1 | 8/2010 | Campbell et al. |
| 2010/0233346 A1 | 9/2010 | Redl et al. |
| 2010/0255172 A1 | 10/2010 | Maningat et al. |
| 2010/0261671 A1 | 10/2010 | Frippiat et al. |
| 2010/0278981 A1 | 11/2010 | Ervin |
| 2010/0303956 A1 | 12/2010 | Hupfer et al. |
| 2010/0303962 A1 | 12/2010 | Penhasi et al. |
| 2010/0303987 A1 | 12/2010 | Watts et al. |
| 2010/0303991 A1 | 12/2010 | Karwowski et al. |
| 2010/0303996 A1 | 12/2010 | Lopez et al. |
| 2010/0303997 A1 | 12/2010 | Fulton |
| 2010/0310747 A1 | 12/2010 | Paulus et al. |
| 2010/0310748 A1 | 12/2010 | David et al. |
| 2010/0310749 A1 | 12/2010 | Cristadoro et al. |
| 2010/0316765 A1 | 12/2010 | French et al. |
| 2010/0316772 A1 | 12/2010 | Zubanas et al. |
| 2010/0316786 A1 | 12/2010 | Frohberg |
| 2010/0323088 A1 | 12/2010 | David et al. |
| 2010/0330256 A1 | 12/2010 | Lang et al. |
| 2011/0008491 A1 | 1/2011 | Mulder et al. |
| 2011/0008493 A1 | 1/2011 | Zorea |
| 2011/0021643 A1 | 1/2011 | Endo et al. |
| 2011/0027412 A1 | 2/2011 | Spence et al. |
| 2011/0038940 A1 | 2/2011 | Grizeau |
| 2011/0038984 A1 | 2/2011 | Afinsen et al. |
| 2011/0038995 A1 | 2/2011 | Thulin et al. |
| 2011/0039004 A1 | 2/2011 | Garter |
| 2011/0081446 A1 | 4/2011 | Aldred et al. |
| 2011/0081475 A1 | 4/2011 | Huber et al. |
| 2011/0117265 A1 | 5/2011 | Muller et al. |
| 2011/0039002 A1 | 6/2011 | Verkoeijen et al. |
| 2011/0143007 A1 | 6/2011 | Stengel |
| 2011/0159158 A1 | 6/2011 | Penna et al. |
| 2011/0166085 A1 | 7/2011 | Beck-hoven Van et al. |
| 2011/0177223 A1 | 7/2011 | Mulder et al. |
| 2011/0195130 A1 | 8/2011 | Siegal |
| 2011/0206743 A1 | 8/2011 | Van Baalen et al. |
| 2011/0212916 A1 | 9/2011 | Bird et al. |
| 2011/0217411 A1 | 9/2011 | Van Der Beek et al. |
| 2011/0229602 A1 | 9/2011 | Aymard et al. |
| 2011/0250299 A1 | 10/2011 | Baseeth et al. |
| 2011/0256207 A1 | 10/2011 | Arndt et al. |
| 2011/0256261 A1 | 10/2011 | Jane et al. |
| 2011/0256278 A1 | 10/2011 | Hansa et al. |
| 2011/0268836 A1 | 11/2011 | Seneci |
| 2011/0274741 A1 | 11/2011 | Horton |
| 2011/0281818 A1 | 11/2011 | Jenkins et al. |
| 2011/0293809 A1 | 12/2011 | Petronio et al. |
| 2011/0296560 A1 | 12/2011 | Frohberg et al. |
| 2012/0035127 A1 | 2/2012 | Goffin et al. |
| 2012/0039956 A1 | 2/2012 | Harel et al. |
| 2012/0040070 A1 | 2/2012 | Mingus et al. |
| 2012/0052151 A1 | 3/2012 | Sannino et al. |

(56) References Cited

U.S. PATENT DOCUMENTS

| | | |
|---|---|---|
| 2012/0064015 A1 | 3/2012 | Valeri |
| 2012/0076910 A1 | 3/2012 | de Almeida et al. |
| 2012/0114770 A1 | 5/2012 | Regina et al. |
| 2012/0129805 A1 | 5/2012 | Li et al. |
| 2012/0138462 A1 | 6/2012 | Vann et al. |
| 2012/0141652 A1 | 6/2012 | Watanabe et al. |
| 2012/0156288 A1 | 6/2012 | Lakkis et al. |
| 2012/0183646 A1 | 7/2012 | de Laat |
| 2012/0196023 A1 | 8/2012 | Nagahata et al. |
| 2012/0258234 A1 | 10/2012 | Penna et al. |
| 2012/0283338 A1 | 11/2012 | Adkins et al. |
| 2012/0295003 A1 | 11/2012 | Daniel |
| 2012/0295007 A1 | 11/2012 | Singer |
| 2012/0322756 A1 | 12/2012 | Van Der Beek et al. |
| 2013/0040018 A1 | 2/2013 | Alexandre et al. |
| 2013/0040034 A1 | 2/2013 | Matsubara et al. |
| 2013/0052300 A1 | 2/2013 | Dendooven et al. |
| 2013/0064926 A1 | 3/2013 | Zapp Glauser |
| 2013/0071523 A1 | 3/2013 | Barrett et al. |
| 2013/0071524 A1 | 3/2013 | Barrett et al. |
| 2013/0089639 A1 | 4/2013 | Petre et al. |
| 2013/0115362 A1 | 5/2013 | Regina |
| 2013/0202742 A1 | 8/2013 | Prakash et al. |
| 2013/0202763 A1 | 8/2013 | Prakash et al. |
| 2013/0202764 A1 | 8/2013 | Prakash et al. |
| 2013/0209646 A1 | 8/2013 | Kothapalli et al. |
| 2013/0236604 A1 | 9/2013 | De Baets |
| 2013/0243925 A1 | 9/2013 | van Lengerich et al. |
| 2013/0259978 A1 | 10/2013 | Bouvet et al. |
| 2013/0288606 A1 | 10/2013 | Kirsch |
| 2013/0316063 A1 | 11/2013 | Johnson et al. |
| 2013/0345139 A1 | 12/2013 | Oesser et al. |
| 2014/0023771 A1 | 1/2014 | Prakash et al. |
| 2014/0044826 A1 | 2/2014 | Regina et al. |
| 2014/0099404 A1 | 4/2014 | Dohl et al. |
| 2014/0167307 A1 | 6/2014 | Horton |
| 2014/0170260 A1 | 6/2014 | Van Der Beek et al. |
| 2014/0187480 A1 | 7/2014 | Van Der Beek et al. |
| 2014/0205709 A1 | 7/2014 | Li et al. |
| 2014/0205719 A1 | 7/2014 | Lanvin et al. |
| 2014/0220174 A1 | 8/2014 | Abrahamse et al. |
| 2014/0314932 A1 | 10/2014 | Ganjyal et al. |
| 2014/0322405 A1 | 10/2014 | Singer, Jr. |
| 2014/0356505 A1 | 12/2014 | Okoniewska et al. |
| 2015/0037469 A1 | 2/2015 | Foltz et al. |

FOREIGN PATENT DOCUMENTS

| | | |
|---|---|---|
| CA | 2141974 A | 8/1995 |
| CA | 2141974 A1 | 8/1995 |
| CN | 1394116 | 1/2003 |
| CN | 1688199 | 10/2005 |
| CN | 1906216 | 1/2007 |
| CN | 101142932 | 3/2008 |
| CN | 100421576 | 10/2008 |
| CN | 101505614 | 8/2009 |
| CN | 101897353 | 12/2010 |
| EP | 0372596 | 6/1990 |
| EP | 0372596 A2 | 6/1990 |
| EP | 0459551 A1 | 12/1991 |
| EP | 1553841 | 5/2006 |
| EP | 2720551 B1 | 4/2015 |
| EP | 2720549 B1 | 5/2015 |
| JP | S5129254 A | 3/1976 |
| JP | 06503228 | 4/1994 |
| JP | H06153801 A | 6/1994 |
| JP | H11318337 A | 11/1999 |
| JP | 2006527996 | 10/2000 |
| JP | 2002507399 A | 3/2002 |
| JP | 2003310165 A | 11/2003 |
| JP | 2004161992 A | 6/2004 |
| JP | 2009060811 A | 3/2009 |
| JP | 2010-104236 A | 5/2010 |
| JP | 55611741 | 7/2014 |
| WO | 1990015147 | 12/1990 |
| WO | 1994002023 | 2/1994 |
| WO | 1994022330 | 10/1994 |
| WO | 1996004799 | 2/1996 |
| WO | 9918804 A1 | 4/1999 |
| WO | 9948372 A1 | 9/1999 |
| WO | 03037105 A1 | 5/2003 |
| WO | 2007095977 A1 | 8/2007 |
| WO | 2008151062 | 12/2008 |
| WO | 2009056255 | 5/2009 |
| WO | 2009102845 | 8/2009 |
| WO | 2009158588 | 12/2009 |
| WO | 2010046492 A1 | 4/2010 |
| WO | 20100046492 | 4/2010 |
| WO | WO 2010/046492 | 4/2010 |
| WO | 20100059945 | 5/2010 |
| WO | 2010092023 | 8/2010 |
| WO | 2010092023 A2 | 8/2010 |
| WO | 2011006949 | 1/2011 |
| WO | 20110014468 | 2/2011 |
| WO | 2011084978 | 7/2011 |
| WO | 2012120154 A2 | 9/2012 |
| WO | 2012120155 A2 | 9/2012 |
| WO | 2012120156 | 9/2012 |
| WO | 2012155154 | 11/2012 |
| WO | 2013079084 | 6/2013 |
| WO | 2013126015 | 8/2013 |
| WO | 2013182564 A1 | 12/2013 |
| WO | 2013191542 A1 | 12/2013 |
| WO | 2014046542 | 3/2014 |
| WO | 2014081807 | 5/2014 |
| WO | 2014083161 A1 | 6/2014 |
| WO | 2014152037 A1 | 9/2014 |

OTHER PUBLICATIONS

International Patent Application No. PCT/US2012/043303, Notification of Transmittal of the International Search Report and the Written Opinion of the International Searching Authority, or the Declaration, dated Nov. 16, 2012, 13 pages.

Grobelnik et al., "Rheological Properties of Dough Made From Grain Amaranth-Cereal Composite Flours Based on Wheat and Spelt", Czech J. Food Sci., vol. 27, 2009, No. 5, pp. 309-319.

Chevallier et al., "Physicochemical Behaviors of Sugars, Lipids, and Gluten in Short Dough and Biscuit", J. Agric Food Chem., 2000, 48(4), pp. 1322-1326.

Webpage: http://www.imchef.org/por-que-dejar-reposar-las-masas/.

Webpage: http://www.pequerecetas.com/recetas-de-postres-para-ninos/postres-de-ninos-glaseado/.

Miao Ming et al., "Study on a novel functional ingredient—slowly digestible starches with a low glycemic index", China Food Additive, No. 2, pp. 78-86.

Zheng Xiao, "Mechanical Analysis of Molding and Mold Releasing in Roller Printing Biscuit Machine", Journal of Wuhan Food Industry College, No. 2, pp. 36-39.

U. Lehmann, et al. "Slowly digestible starch—its structure and health implications: a review", Trends in Food Science and Technology, No. 18, pp. 346-355.

Peng Ya-jun, "Researches on Biscuit Shaping and Separating from Rotary Moulder Roller", Zhuhai Hong Fu Food Mechanical Co., Ltd., (2008).

International Preliminary Report on Patentability from corresponding International Patent Application No. PCT/US2012/043303, dated Dec. 23, 2013, 9 pages.

Webpage: http://www.fao.org/inpho archive/content/documents/vlibrary/ae620s/pprocesados/CERE3.HTM. 2006.

Webpage: http://magrama.gob.es/es/alimentacion/temas/industria-agroalimentaria/guia marco pr%C3% A1cticas fabricaci%C3%B3n galletas tcm7-203291.pdf.

Japanese Office Action for Japanese Application No. 2014516328 dated Jul. 7, 2015, 12 pages.

International Search Report and Written Opinion for International Application PCT/EP2012/061887, dated Jun. 20, 2012, 4 pages.

Reference to "Cookie Chemistry and Technology" by Karel Pulp, published by American Institute of Baking in 1994 (guide to the science, engineering and art of cookies technology sharing with reader ingredients of a cookie).

(56) References Cited

OTHER PUBLICATIONS

International Search Report and Written Opinion for International Application PCT/EP2012/061888, dated Jun. 20, 2012, 5 pages.
Technical Information citing "Biscuit, Cookie and Cracker Manufacturing Manuals" written by Duncan Manley, published by Elsevier Science Limited, 1998 (contains materials and ingredients for producing a cookie, choosing the materials for the production of the the cookie, et al., and packing materials).
International Search Report and Written Opinion for International Application PCT/EP2012/0618891 dated Jun. 20, 2012, 5 pages.
Blaak, E.E. (1995). Health Aspects of Various Digestible Carbohydrates. Nutrition Research, 15(10), 1547-1573.
Englyst, K.N. (2003). Glycaemic index of cereal products explained by their content of rapidly and slowly available glucose. British Journal of Nutrition, vol. 89, 329-339.
Physical Dough Tests, American Association of Cereal Chemists AACC Method 54-21, Farinograph Method for Flour.
Nabim Wheat and Flour Testing, The National Association of British and Irish Millers, 2011.
Bjorck, I., et al. (1984). Effects of Processing on Starch Availability in Vitro and in Vivo. II. Drum-Drying of Wheat Flour. Journal of Cereal Science, vol. 2, 165-178.
Penson, S., Head of of Cereals and Milling Dept., Campden BRI, UK, "Wheat Quality Requirements", presentation Slides.
Frewin, Angela. "Biscuit Belvita breakfast bar from Kraft Foods." The Caterer, Mar. 24, 2010. Web. Jan. 27, 2016.
Aller, E.E.J.G., et al. (2011). Starches, Sugars and Obesity. Nutrients, vol. 3, 341-369.
Nabim Wheat Guide 2011, The National Association of British and Irish Millers.
Garsetti, M., et. al. (2005). The Glycemic and Insulinemic Index of Plain Sweet Biscuits: Relationships to in Vitro Starch Digestability. Journal of the American College of Nutrition, 24(6), 441-447.
Sandel, Chris. "Product Review." 7 Health, Apr. 8, 2011. Web. Jan. 28, 2016.
Scientific Opinion from the European Food Safety Authority (EFSA) published Jul. 21, 2011.
Wheat: Chemistry and Technology, vol. II, Edited by Y. Pomeraz, American Assoc. of Cereal Chemists, Inc.
Our homemade ANZAC biscuit, cookpad, Recipe ID: 343189, Aug. 11, 2009.
Shigehisa Shibata and Toshiaki Nakae, 4.1 Type of flour, Knowledge of Wheat Flour Products, Revised and updated version, second printing, pp. 67-72, Saiwai Shobo, 2000.
Kazufumi Yamaki, et al., Utilization of Hokkaido-grown Wheat in Sponge Cake, Hokkaido Research Organization, Food Processing Research Center Report, No. 2, pp. 5-10, 1996.
ISO (2013). ISO 5530 Wheat Flour—Physical characteristics of doughs.
Acquistucci et al. "Italian buckwheat (*Fagopyrum esculentum*) starch: Physico-chemical and functional characterization and in vitro digestibility" Nahrung 41:5S pp. 281-284 (1997).
Angioloni et al. "Nutritional and functional added value of oat, Kamut, spelt, rye and buckwheat versus common wheat in breadmaking" J Sci Food Agric 91 pp. 1283-1292 (2011).
Corradini et al. "Squeezing flow of semi liquid foods between parallel Teflon coated plates" Rheol Acta 39 pp. 452-460 (2000).
Englyst et al. "Rapidly available glucose in foods: an in vitro measurement that reflects the glycemic response" Am J Clin Nutr 69 pp. 448-454 (1999).
"Kraft Breakfast Cereal Biscuits: Nutritional and Metabolic Assets" Kraft Foods Europe Research and Development Brochure for Professionals, 15 pages.
Rathi et al. "Influence of depigmentation of pearl millet (*Pennisetum gluacum* L.) on sensory attributes, nutrient composition and in vitro digestibility of biscuits" Lebensm Wiss U Technol 37 pp. 187-192 (2004).
Skrabanja et al. "Nutritional Properties of Starch in Buckwheat Products: Studies in Vitro and in Vivo" J Agric Food Chem 49 pp. 490-496 (2001).
Yamaki et al. "Utilization of Hokkaido-grown Wheat in Sponge Cake" Hokkaido Food Publication No. 2 pp. 5-10 (1996).
International Patent Application No. PCT/EP2012/061891 International Search Report and Written Opinion dated Sep. 14, 2012, 10 pages.
Chinese Patent Application No. 201280030321.5 Notification of Reexamination dated Nov. 18, 2016, 9 pages.
International Patent Application No. PCT/EP2012/061887 International Preliminary Report on Patentability dated Dec. 23, 2013, 6 pages.
Japanese Patent Application No. 2014-516329 Official Notice of Final Decision of Rejection dated Feb. 9, 2016, 12 pages.
Japanese Patent Application No. 2016-516872 Notification of Reasons for Refusal dated Dec. 22, 2016, 12 pages.
International Patent Application No. PCT/US2014/026853 International Search Report and Written Opinion dated Jul. 24, 2014, 9 pages.
International Patent Application PCT/US2014/059012 international Search Report and Written Opinion dated Dec. 22, 2014, 8 pages.
International Patent Application PCT/US2014/026853 International Preliminary Report on Patentability dated Sep. 15, 2015, 8 pages.
Baljeet et al. "Studies on functional properties and incorporation of buckwheat flour for biscuit making" Intl Food Res J 17: pp. 1067-1076 (2010).
Zhang et al., "Controlled Glucose Delivery in Food for Optimal Health", Journal of Food Science and Biotechnology, vol. 29, No. 4, pp. 481-487 (2010).
Indian Examination Report, Application No. 282/CHEN/2014; dated Aug. 27, 2018; 8 pages.
Archana Rathi et al: "Influence of depigmentation of pearl millet (*Pennisetum gluacum* L. on sensory attributes, nutrient composition and in vitro digestibility of biscuits". LWT—Food Science and Technology, vol. 7, No. 2, Mar. 1, 2004, pp. 187-192, XP055144191, ISSN: 0023-6438, DOI: 10.1016/j.lw.

\* cited by examiner

BREAKFAST BISCUIT WITH SLOWLY AVAILABLE GLUCOSE

CROSS-REFERENCE TO RELATED APPLICATIONS

The present application is a U.S. National Stage Entry of International Patent Application No. PCT/US2012/043303, filed 20 Jun. 2012, which in turn claims priority benefit from U.S. Provisional Patent Application No. 61/498,986, filed 20 Jun. 2011, and European Patent Application Nos.: 11290279.6, filed 20 Jun. 2011, and 11290278.8, filed 20 Jun. 2011, all of which are hereby incorporated by reference in their entireties.

BACKGROUND OF THE INVENTION

The present invention relates to food products containing slowly available glucose.

BRIEF SUMMARY OF THE INVENTION

According to some embodiments of the present invention, a baked cereal product has a pre-baked SAG content and a post-baked SAG content, wherein the post-baked SAG content is less than about 25% below the pre-baked SAG content; less than about 10% below the pre-baked SAG content; or about the same as the pre-baked SAG content. In some embodiments, the cereal product has a pre-baked moisture content and a post-baked moisture content, and wherein the pre-baked moisture content is about 18 wt % moisture or less and the post-baked moisture content is about 5 wt % moisture or less; or the pre-baked moisture content is about 14 wt % or less and the post-baked moisture content is about 4 wt % or less.

In some embodiments, the baked cereal product is dough-based. The baked cereal product may have a post-baked SAG content of greater than about 15 g per 100 g of baked cereal product; greater than about 15.8 g per 100 g of baked cereal product; or greater than about 17 g per 100 g of baked cereal product.

In certain embodiments, the cereal product includes whole grains in an amount of at least about 30 wt % of the weight of the cereal product. Whole grains may include flakes, oats, and/or flour. In some embodiments, the cereal product includes about 20 wt % to about 80 wt % refined flour. Refined flour may include soft wheat flour.

In some embodiments, the cereal product includes starch in an amount of at least about 15 wt % of the cereal product, and the starch includes less than about 15% gelatinized starch.

According to some embodiments of the present invention, a baked cereal product includes an SAG content of greater than about 15 g per 100 g of the baked cereal product, and a moisture level of about 4 wt % of the baked cereal product or less.

In some embodiments, the cereal product includes protein in an amount of about 0.1 wt % to about 20 wt % of the weight of the cereal product; and/or fat in an amount of about 0.1 wt % to about 20 wt % of the weight of the cereal product. In some embodiments, the baked cereal product includes sugar that makes up to at most about 27.5% of a total caloric value of the cereal product; and fat that makes up to at most about 38.0% of a total caloric value of the cereal product. The cereal product may have inclusions, for example, fruit, grains, oats, rye flakes and/or chocolate chips.

According to certain embodiments of the present invention, a method for preparing a baked cereal product includes preparing a dough comprising grains; forming the dough to provide a dough piece; and baking the dough piece to provide a baked cereal product, such that the baked cereal product has a post-baked SAG content of at least about 15 g per about 100 g of the baked cereal product.

In some embodiments, preparing a dough includes mixing a liquid fat and water to create an emulsion before adding the grains. In certain embodiments, the dough piece is formed by rotary moulding. In some embodiments, the dough piece includes starch, and an internal temperature of the dough piece remains below a gelatinization temperature of the starch during baking. In some embodiments, an internal temperature of the dough piece is below about 100° C. during an initial baking stage. The initial baking stage may be, for example, about 3 minutes.

According to some embodiments of the present invention, a method for preparing a baked cereal product including preparing a dough comprising grains; forming the dough to provide a dough piece; and baking the dough piece to provide a baked cereal product, wherein the cereal product has a pre-baked SAG content and a post-baked SAG content, and wherein the post-baked SAG content is less than about 25% below the pre-baked SAG content.

According to certain embodiments of the present invention, a baked cereal product includes an SAG content of at least about 15 g per about 100 g of the baked cereal product; and, a hardness in bite intensity of about 21.5 to about 41, as measured according to ISO 13299 2003 using an unstructured continuous scale from 0 to 60. In some embodiments, the baked cereal product includes a hardness in bite intensity of about 25 to about 41; about 26 to about 37.8; about 26.4 to about 37.8; about 35 to about 40; about 25 to about 40; or about 21.5 to about 40.

In some embodiments, the baked cereal product includes whole grains in an amount of at least about 15 wt % of the cereal product.

According to some embodiments of the present invention, a baked cereal product includes an SAG content of at least about 15 g per about 100 g of the baked cereal product; soft white wheat flour; whole grains in an amount of at least about 15 g per 100 g of the baked cereal product; and a hardness in bite intensity of about 26.4 to about 37.8, as measured according to ISO 13299 2003 using an unstructured continuous scale from 0 to 60.

In some embodiments, the baked cereal product includes whole grains in an amount of at least about 20 wt % of the baked cereal product; at least about 25 wt % of the baked cereal product; or at least about 30 wt % of the baked cereal product.

In certain embodiments, the baked cereal product includes flour with a water absorption under 55%, as measured according to NF-ISO-5530-1 norm.

According to certain embodiments of the present invention, a method for preparing a baked cereal product includes preparing a dough comprising grains; forming the dough to provide a dough piece; and baking the dough piece to provide a baked cereal product, such that the baked cereal product comprises a post-baked SAG content of at least about 15 g per about 100 g of the baked cereal product and a hardness in bite intensity of about 21.5 to about 41, as measured according to ISO 13299 2003 using an unstructured continuous scale from 0 to 60.

According to certain embodiments of the present invention, a method for preparing a baked cereal product includes preparing a dough comprising grains; forming the dough to provide a dough piece; and baking the dough piece to provide a baked cereal product, such that the baked cereal product comprises a post-baked SAG content of at least about 15 g per about 100 g of the baked cereal product; soft white wheat flour; whole grains in an amount of at least about 15 g per 100 g of the baked cereal product; and a hardness in bite intensity of about 26.4 to about 37.8, as measured according to ISO 13299 2003 using a unstructured continuous scale from 0 to 60.

According to some embodiments of the present invention, a method for producing a cereal product such as a ready-to-eat biscuit comprising at least about 29 wt % wholegrain cereal flour, about 5 wt % to about 22 wt % fat, and at most about 30 wt % sugar relative to the total weight of the biscuit, wherein the slowly-digestible-starch-over-total-available-starch ratio of the biscuit is at least about 31 wt %, the method including: mixing a cereal flour comprising the wholegrain cereal flour with fat and sugar and at most about 8 wt % added water relative to the total weight of the dough, to form a dough; moulding the dough into the shape of a biscuit; and baking the biscuit; wherein the cereal flour includes refined cereal flour in an amount of at least about 14.5 wt % of the dough and wherein the refined cereal flour has a water absorption under 55% as measured by Brabender® Farinograph® according to NF-ISO-5530-1 norm. In some embodiments, the biscuit has a SAG value of at least about 15.0 g/100 g of biscuit.

In some embodiments, the cereal product, such as a biscuit, includes wholegrain cereal flour including at least two different types of wholegrain cereal flour. In some embodiments, the cereal product includes refined cereal flour, such as refined wheat flour. The refined wheat flour may be selected from soft wheat flour, wheat flour with low damaged starch and thermally treated wheat flour, including combinations of two or more thereof.

In some embodiments, a cereal product is prepared by rotary moulding, which may include: (i) a moulding cylinder and a grooved cylinder for shaping the dough into the biscuit, the moulding cylinder receiving the dough and the grooved cylinder with grooves of about 5 to about 15 mm, preferably about 10 mm, pressing the dough in the moulding cylinder; and, optionally (ii) a hopper playing the role of a funnel for feeding the moulding and grooved cylinders; and/or (iii) a demoulding belt for demoulding the biscuit; wherein the difference of speed between the grooved cylinder and the moulding cylinder is preferably maintained under about 10%. In some embodiments, the rotary moulder further comprises a humidifier for the demoulding belt.

In certain embodiments, a cereal product such as a ready-to-eat biscuit includes at least about 29 wt % wholegrain cereal flours, about 5 wt % to about 22 wt % fat, and at most about 30 wt % sugar over the total weight of the biscuit, wherein the slowly-digestible-starch-over-total-available-starch ratio of the biscuit is at least about 31 wt %.

In some embodiments, a cereal product includes wholegrain cereal flour including wholegrain wheat flour and at least one wholegrain cereal flour selected from wholegrain barley flour, wholegrain rye flour, wholegrain spelt flour and wholegrain oat flour, including combinations of two or more thereof. In some embodiments, the wholegrain wheat flour represents at most about 80 wt % of the wholegrain cereal flour. Such whole grain cereal flour may include wholegrain barley flour, wholegrain rye flour, wholegrain spelt flour and wholegrain wheat flour. In some embodiments, the cereal product includes wholegrain cereal flakes wherein the amount of wholegrain cereal flakes is preferably at most about 11 wt % relative to the total weight of the biscuit.

In some embodiments, a cereal product such as a biscuit includes about 9 wt % to about 18 wt % fat relative to the total weight of the biscuit; and/or at most about 27 wt % sugar relative to the total weight of the biscuit.

In some embodiments, a cereal product includes a cookie made up of a filling part and a biscuit part including at least one biscuit.

According to some embodiments of the present invention, a method for producing a cereal product such as a layered cookie including at least one biscuit and a filling, the layered cookie containing about 10 wt % to about 25 wt % fat and about 15 wt % to about 40 wt % sugar, wherein the slowly-available-glucose-over-total-available-starch ratio of the layered cookie is at least about 31 wt %, includes: forming a dough comprising a cereal flour, fat, sugar and at most about 8 wt % added water relative to the total weight of the dough; moulding the dough into the shape of a biscuit; the biscuit; and assembling the biscuit with a filling to form a layered cookie; wherein the cereal flour comprises refined cereal flour, in an amount of at least about 21 wt % over the total weight of the dough, with a water absorption under 55% as measured by Brabender® Farinograph®.

In some embodiments, the layered cookie is a sandwich cookie including a further biscuit and wherein the biscuits sandwich the filling. In some embodiments, the layered cookie has a slowly available glucose value of at least about 15.0 g/100 g of layered cookie. In some embodiments, a ready-to-eat layered cookie includes a biscuit and a filling, the layered cookie containing about 10 wt % to about 25 wt % fat and about 15 wt % to about 40 wt % sugar, wherein the slowly-digestible-starch-over-total-available-starch ratio of the layered cookie is at least about 31 wt %.

In certain embodiments, the layered cookie is a sandwich cookie including a further biscuit part and wherein the biscuits sandwich the filling. In some embodiments, the layered cookie includes at least about 30 wt % total starch over the total weight of the layered cookie. In some embodiments, the layered cookie has a slowly available glucose value of at least about 15.0 g/100 g of layered cookie; about 12 wt % to about 20 wt % fat and/or containing about 20 wt % to about 32 wt % sugar; and/or about 5 wt % to about 30 wt % fat over the total weight of the biscuit and/or about 10 wt % to about 25 wt % sugar relative to the total weight of the biscuit.

In some embodiments, the filling contributes to about 10 wt % to about 40 wt % of the layered cookie. The filling may have between about 2.0 wt % to about 40.0 wt % of non-gelatinized added starch relative to the weight of the filling. In certain embodiments, the layered cookie may contain about 2 wt % to about 15 wt % over the total weight of the sandwich cookie, of solid pieces, wherein the solid pieces do not increase SAG content. According to certain embodiments of the present invention, a dough for producing a cereal product such as a biscuit having a slowly-digestible-starch-over-total-available-starch ratio of at least about 31%, the biscuit comprising at least about 29 wt % cereal flour, about 5 to about 22 wt % fat and at most about 30 wt % sugar relative to the total weight of the biscuit, includes: cereal flour, fat, sugar and added water; and wherein the added water is in an amount of at most about 8 wt % relative to the weight of dough.

In some embodiments, the added water is in an amount of from about 3 to about 7 wt % relative to the weight of dough. In certain embodiments, the dough has a pre-baking density of from about 1.0 to about 1.5 g/cm³. The dough may include cereal flour including a refined cereal flour with a water absorption under 55% as measured by Brabender® Farinograph® and, preferably, the refined cereal flour forms at least about 14.5 wt % of the biscuit. In some embodiments, the dough includes cereal flour including wheat flour, preferably selected from one or more of soft wheat flour, wheat flour with low damaged starch and thermally treated wheat flour, and combinations of two or more thereof. In certain embodiments, the dough includes wholegrain cereal flour, preferably at least two different types of wholegrain cereal flour; the wholegrain cereal flour may be present in an amount of at least about 29 wt % of the biscuit. In some embodiments, the dough includes at most about 19 wt % wholegrain cereal flakes by weight of the biscuit.

In certain embodiments, the dough has a particle size distribution such that at least about 20 wt %, preferably at least about 30 wt %, of the dough passes through a vibrating sieve mesh of 10 mm; such that at least about 8 wt % of the dough passes through a vibrating sieve mesh of 2 mm; and/or such that the D10 of the dough mass distribution is at most about 6 mm.

In some embodiments, the dough requires a pressure of at least about 5000 kg/m² to compress the dough to a density of about 1.22 g/cm³; or the pressure required to compress the dough to a density of about 1.22 g/cm³ is from about 6500 to about 30000 kg/m².

In some embodiments, the dough includes at least about 29 wt % cereal flour, about 4 to about 20 wt % fat and at most about 27 wt % sugar.

According to some embodiments of the present invention, a method for forming a cereal product, such as a biscuit, having a slowly-available-glucose-over-total-available-starch ratio of at least about 31%, the biscuit comprising at least about 29 wt % cereal flour, about 5 to about 22 wt % fat and at most about 30 wt % sugar relative to the total weight of the biscuit, the method including: providing a dough; moulding the dough into the shape of the biscuit; and baking the biscuit. In some embodiments, the step of moulding the dough involves compressing the dough to a pre-baking density of from about 1.0 to about 1.5 g/cm³. In certain embodiments, the baking is: (i) conducted for a time of from about 4 to about 12 minutes; and/or (ii) conducted so that the temperature within the biscuit does not exceed about 110° C., preferably less than about 100° C., within the first 2 minutes of baking.

In some embodiments, the dough is mixed in a multi-step process and wherein: the ingredients, excluding the added water, cereal flour and wholegrain cereal flakes, if present, are mixed together, then the added water is added; then the cereal flour is added; then the wholegrain cereal flakes, if present, are added.

In some embodiments, a cereal product such as a layered cookie contains about 10 wt % to about 25 wt % fat and about 15 wt % to about 40 wt % sugar relative to the total weight of the layered cookie. In some embodiments, a cereal product such as a biscuit has an SAG value of at least about 15.0 g/100 g, preferably about 16.5 g/100 g and more preferably at least about 18.0 g/100 g, and ever more preferably at least about 21.0 g/100 g.

BRIEF DESCRIPTION OF THE SEVERAL VIEWS OF THE DRAWINGS

The foregoing summary, as well as the following detailed description of certain embodiments of a food product will be better understood when read in conjunction with the following exemplary embodiments, the appended drawing and the appendices.

DETAILED DESCRIPTION OF THE INVENTION

Figure 1:
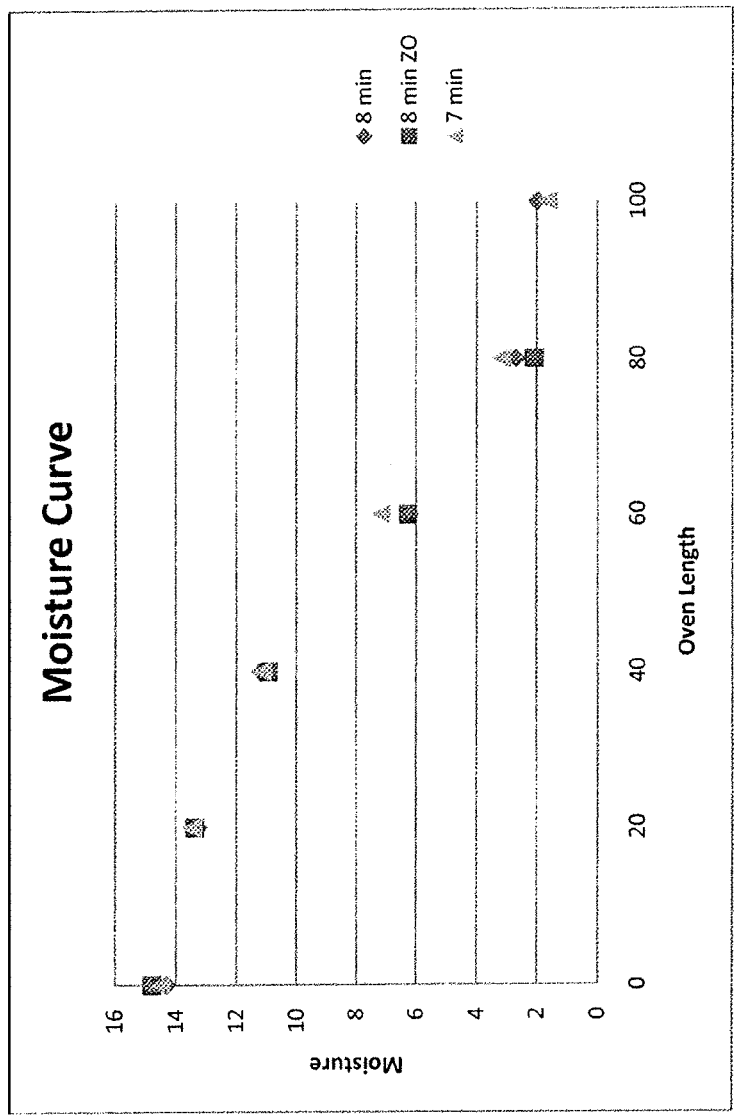
FIG. 1 shows moisture content of an exemplary cereal product during baking, as a function of oven length.

Methods and compositions of some embodiments of the present invention relate to cereal products containing slowly available glucose ("SAG"). SAG refers to the amount of glucose (from sugar and starch, including maltodextrins) likely to be available for slow absorption in the human small intestine. In the present case of the disclosure, the slowly digestible starch ("SDS") content equals the SAG content because there is no other SAG source than starch, i.e. SDS. Rapidly available glucose (RAG) refers to the amount of glucose likely to be available for rapid absorption in the human small intestine.

SAG, as used herein, is defined and measured according to the Englyst method ("Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337). SAG content in a cereal product may be controlled by the formulation of the cereal product as well as the processing conditions involved in preparing the cereal product. In some embodiments, a cereal product with desired levels of SAG provides a beneficial effect in maintaining blood glucose levels over extended time. As used herein, a pre-baked cereal product refers to a prepared, formed dough, prior to baking. A pre-baked SAG refers to the SAG content in the pre-baked cereal product. A post-baked SAG refers to the SAG content in the baked cereal product.

Cereal Product

Cereal products of some embodiments of the present invention may be formulated to include desired levels of SAG. In some embodiments, the cereal product includes desired proportions of carbohydrates, fats, and proteins. In some embodiments, higher SAG values are associated with the presence of ungelatinized starch. Starch gelatinization may enable starch to be more easily digested and therefore reduce the SAG in the final product.

Cereal products according to embodiments of the present invention can take on any suitable form, including but not limited to biscuits, miniature biscuits, cookies, sandwich cookies, or iced cookies.

Carbohydrates

Carbohydrates may be present in the cereal product in the form of sugars, starch fractions and nonstarch polysaccharides. In some embodiments, carbohydrates are provided from sources including but not limited to flour, flakes, wheat, oats, rye, barley spelt, and/or kamut. In some embodiments, carbohydrates are provided from whole grains. Whole grains may include, for example, flour, flakes, and/or oats.

In one embodiment, a cereal product does not contain carbohydrates provided from corn starch or modified corn starch.

In some embodiments, a cereal product contains carbohydrates in an amount of about 50 wt % to about 95 wt % of the cereal product; about 55 wt % to about 85 wt % of the cereal product; about 60 w % to about 80 wt % of the cereal product; about 65 wt % to about 75 wt % of the cereal product; about 50 wt % of the cereal product; about 55 wt % of the cereal product; about 60 wt % of the cereal product; about 65 wt % of the cereal product; about 70 wt % of the cereal product; about 80 wt % of the cereal product; about 85 wt % of the cereal product; about 90 wt % of the cereal product; or about 95 wt % of the cereal product.

In some embodiments, a cereal product includes starch in an amount of at least about 10 wt % of the cereal product; at least about 15 wt % of the cereal product; at least about 20 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; about 10 wt % to about 75 wt % of the cereal product; about 10 wt % to about 65 wt % of the cereal product; about 10 wt % to about 55 wt % of the cereal product; about 10 wt % to about 50 wt % of the cereal product; about 10 wt % to about 45 wt % of the cereal product; about 15 wt % to about 45 wt % of the cereal product; about 20 wt % to about 45 wt % of the cereal product; about 25 wt % to about 45 wt % of the cereal product; or about 30 wt % to about 40 wt % of the cereal product.

In some embodiments, a cereal product includes flour. Suitable flour may include refined flour and/or whole grain flour. In some embodiments, suitable flour may include thermally treated flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

In some embodiments, a cereal product may include any suitable whole grain and/or refined flour such as wheat flour, graham flour, oat flour, corn flour, rye flour, barley flour, spelt flour, soft wheat flour, hard wheat flour, durum wheat flour, kamut flour, tapioca flour, sago flour, and legume flours such as garbanzo bean flour. Soft wheat flour may include soft red flour and/or soft white flour. Terms "soft" and "hard" are understood to refer to the hardness of the grains of *Triticum aestivum* used to make the flour, rather than the species of wheat. Hardness of the grains may be due to density of the endosperm cells. Soft wheat endosperm has a lower density, which corresponds to weaker starch and protein bonds. Consequently, soft wheat grains may be crushed into fine particles, damaging less starch than in hard wheat grains.

In some embodiments, a cereal product includes a refined flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product. In some embodiments, suitable refined flour may include soft wheat flour, wheat flour with low amounts of damaged starch, and/or thermally treated flour such as thermally treated wheat flour. Wheat flour with low damaged starch means a flour with a content of damaged starch lower than 5.5% of the flour weight. Damaged starch content is the percentage of the starch granules that is physically damaged during the milling operation. It may be measured by AACC 76-31.01 method. Examples of thermally treated wheat flours can be wheat flours treated with various number of heating and cooling cycles or annealed. Annealing is a hydrothermal treatment that changes the physicochemical properties of starches by improving crystal growth and by facilitating interactions between starch chains.

In some embodiments, refined wheat flour may be made of specifically selected milling fractions such that the flour has a very low water absorption, under 55%, as measured by Brabender® Farinograph® according to NF-ISO-5530-1 norm. In some embodiments, the selected milling fractions have a small particle size, i.e. the percentage of fine particles under 40 μm is above 50%. Selecting milling fractions can be assisted by granulometry analysis (by laser granulometry or mesh diameter) during milling. The measure by Brabender® Farinograph® is normalised under NF-ISO-5530-1. Water absorption is defined in this norm as the quantity of water per 100 g of flour at 14 wt % water content needed to have a dough with a maximal consistency of 500 UF. Consistency is the resistance, expressed in arbitrary units (farinographic units UF), of a dough during kneading inside the Farinograph®, at a constant speed specified in the norm. First, water content of the flour is measured. Then, water is added to the flour, quantity of water being calculated so that consistency of the dough is close to 500 UF (480 UF to 520 UF). Flour and water are kneaded together and measures are recorded for two dough troughs. From these measures and the volume of water added to the flour to form the dough, water absorption is obtained.

In some embodiments, a cereal product includes wholegrain flour. In certain embodiments, the wholegrain flour comprises at least two different types of wholegrain flours. Suitable types of wholegrain flours may include but are not limited to wholegrain wheat flour, wholegrain barley flour, wholegrain rye flour, wholegrain spelt flour, wholegrain oat flour, wholegrain rice flour, wholegrain maize flour, wholegrain millet flour, wholegrain sorghum flour, wholegrain teff flour, wholegrain triticale flour, and pseudocereal flour such as amaranth flour and quinoa flour, and mixture thereof. In some embodiments, a cereal product may include whole grain flour in an amount of about 20 wt % to about 95 wt %; about 20 wt % to about 90 wt %; about 20 wt % to about 80 wt % of the cereal product; about 25 wt % to about 75 wt % of the cereal product; about 30 wt % to about 70 wt % of the cereal product; about 35 wt % to about 65 wt % of the cereal product; about 40 wt % to about 60 wt % of the cereal product; about 45 wt % to about 55 wt % of the cereal product; about 20 wt % of the cereal product; about 25 wt % of the cereal product; about 30 wt % of the cereal product; about 35 wt % of the cereal product; about 40 wt % of the cereal product; about 45 wt % of the cereal product; about 50 wt % of the cereal product; about 55 wt % of the cereal product; about 60 wt % of the cereal product; about 65 wt % of the cereal product; about 70 wt % of the cereal product; about 75 wt % of the cereal product; of about 80 wt % of the cereal product.

In some embodiments, a cereal product includes flakes. Flakes may be formed from any suitable grain, including wheat, rye, oats, barley, spelt, kamut, durum wheat and combinations thereof or from any suitable legume such as garbanzo bean flakes or corn tapioca or sago flakes. The process of preparing flakes and specific processing conditions may depend on the botanical origin of flakes. Some flakes such as rye or barley or wheat may be understood to mean grains that are hydrated and/or steamed and/or heated, and rolled and thereby flattened into a grain flake. The flakes may consist of entire grain berries, such as whole oat flakes, medium oat flakes, quick cooking oats, or can be milled further to reduce their size. In some embodiments, a cereal product includes flakes in an amount of about 0.1 wt % to about 50 wt % of the cereal product; about 0.5 wt % to about 40 wt % of the cereal product; about 1 wt % to about 35 wt % of the cereal product; about 5 wt % to about 30 wt % of the cereal product; about 10 wt % to about 20 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; about 35 t % of the cereal product; or about 40 wt % of the cereal product.

In some embodiments, a cereal product includes whole grains in an amount of at least about 10 wt % of the cereal product; at least about 15 wt % of the cereal product; at least about 20 wt % of the cereal product; at least about 25 wt % of the cereal product; at least about 30 wt % of the cereal product; at least about 35 wt % of the cereal product; at least about 40 wt % of the cereal product; at least about 45 wt % of the cereal product; at least about 50 wt % of the cereal product; at least about 55 wt % of the cereal product; at least about 60 wt % of the cereal product; at least about 65 wt % of the cereal product; at least about 70 wt % of the cereal product; at least about 75 wt % of the cereal product; at least about 80 wt % of the cereal product; at least about 85 wt % of the cereal product; at least about 90 wt % of the cereal product; about 5 wt % to about 90 wt % of the cereal product; about 5 wt % to about 95 wt %; about 10 wt % to about 80 wt % of the cereal product; about 15 wt % to about 75 wt % of the cereal product; about 20 wt % to about 70 wt % of the cereal product; about 25 wt % to about 65 wt % of the cereal product; about 30 wt % to about 60 wt % of the cereal product; about 35 wt % to about 55 wt % of the cereal product; or about 40 wt % to about 50 wt % of the cereal product.

In some embodiments, a cereal product includes sugars in an amount of about 0.1 wt % to about 35 wt % of the cereal product; about 1 wt % to about 30 wt % of the cereal product; about 1 wt % to about 25 wt % of the cereal product; about 1 wt % to about 20 wt % of the cereal product; about 5 wt % to about 15 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; about 25 wt % of the cereal product; about 30 wt % of the cereal product; or about 30 wt % of the cereal product. In some embodiments, a cereal product includes fructose in an amount of up to about 10 wt % of the cereal product; up to about 15 wt % of the cereal product; or up to about 20 wt % of the cereal product. In some embodiments, no more than about 25% of the total carbohydrates in a cereal product are from fructose.

Protein

Cereal products of the present invention may also include protein. Suitable sources of protein may include but are not limited to high protein wheat flour or flakes such as durum wheat or kamut flours or flakes, legume flours or flakes such as garbanzo bean flour or flakes, soybean flour or flakes, whey protein concentrate or isolate, or soybean concentrate or isolate.

In some embodiments, a cereal product may include protein in an amount of about 0.1 wt % to about 30 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; or about 35 wt % of the cereal product.

Fat

Cereal products of the present invention may include fat in desired amounts. Fat may be added to the cereal product from any suitable source, including but not limited to shortenings and oils. In some embodiments, cereal product formulations include fat which is liquid at room temperature.

In some embodiments, a cereal product may include fat in an amount of about 0.1 wt % to about 30 wt % of the cereal product; about 0.1 wt % to about 25 wt % of the cereal product; about 0.1 wt % to about 20 wt % of the cereal product; about 1 wt % to about 15 wt % of the cereal product; about 1 wt % to about 10 wt % of the cereal product; about 0.1 wt % of the cereal product; about 1 wt % of the cereal product; about 5 wt % of the cereal product; about 10 wt % of the cereal product; about 15 wt % of the cereal product; about 20 wt % of the cereal product; or about 35 wt % of the cereal product.

In some embodiments, a cereal product includes canola oil, high oleic canola oil, palm oil, soybean oil, sunflower oil, sufflower oil, cottonseed oil, hydrogenated oils, transesterified oils or combinations of thereof. The choice of the oil may depend on desired textural and nutritional properties of the cereal product.

Water

In some embodiments, it is desirable to use a minimal amount of water in a cereal product formulation. In some embodiments, using lower amounts of water may result in lower levels of starch gelatinization, and therefore higher SAG levels in the finished product. In some embodiments, the amount of water included in a formulation is determined by the amount necessary to provide suitable dough rheology for processing and moistness in the final product. In some embodiments, water may be replaced by solvents and/or plasticizers that may mimic water behaving during processing. Examples of suitable water replacements may include propylene glycol and/or ethyl alcohol.

Water may be added to a dough in an amount about 1 wt % to about 10 wt % of the dough; about 1 wt % to about 7 wt % of the dough; about 3 wt % to about 7 wt % of the dough; about 2 wt % to about 6 wt % of the dough; about 3 wt % to about 8 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; or about 10 wt % of the dough.

In some embodiments, a dough has a moisture content of about 1 wt % to about 18 wt % of the dough; about 2 wt % to about 14 wt % of the dough; about 8 wt % to about 14 wt % of the dough; about 3 wt % to about 10 wt % of the dough; about 4 wt % to about 6 wt % of the dough; about 1 wt % of the dough; about 2 wt % of the dough; about 3 wt % of the dough; about 4 wt % of the dough; about 5 wt % of the dough; about 6 wt % of the dough; about 7 wt % of the dough; about 8 wt % of the dough; about 9 wt % of the dough; or about 10 wt % of the dough.

In some embodiments, a pre-baked cereal product has a moisture content of about 1 wt % to about 18 wt % of the pre-baked cereal product; about 2 wt % to about 14 wt % of the pre-baked cereal product; about 8 wt % to about 14 wt % of the pre-baked cereal product; about 3 wt % to about 10 wt % of the pre-baked cereal product; about 4 wt % to about 6 wt % of the pre-baked cereal product; about 1 wt % of the pre-baked cereal product; about 2 wt % of the pre-baked cereal product; about 3 wt % of the pre-baked cereal product; about 4 wt % of the pre-baked cereal product; about 5 wt % of the pre-baked cereal product; about 6 wt % of the pre-baked cereal product; about 7 wt % of the pre-baked cereal product; about 8 wt % of the pre-baked cereal product; about 9 wt % of the pre-baked cereal product; or about 10 wt % of the pre-baked cereal product.

In some embodiments, a baked cereal product has a moisture content of about 0.5 wt % to about 5 wt % of the cereal product; about 1 wt % to about 4 wt % of the cereal product; about 1.5 wt % to about 3 wt % of the cereal product; about 0.5 wt % of the cereal product; about 1 wt % of the cereal product; about 1.5 wt % of the cereal product; about 2 wt % of the cereal product; about 2.5 wt % of the cereal product; about 3 wt % of the cereal product; about 3.5 wt % of the cereal product; about 4 wt % of the cereal product; about 4.5 wt % of the cereal product; or about 5 wt % of the cereal product.

Inclusions

Cereal products of the present invention may include suitable inclusions. Inclusions may provide textural, aesthetic, as well as nutritional benefits. In cereal products of some embodiments of the present invention, an inclusion is understood to be a component of the cereal product that does not become part of the gluten or dough matrix. In some embodiments, a cereal product may contain inclusions such as fruit, grains, oats, rye, barley, spelt, kamut, flakes and/or chocolate chips, any other suitable inclusion, or combinations thereof. Suitable fruits may include but are not limited to blueberries, strawberries, raspberries, bananas, peaches, and the like.

In some embodiments, formulations and methods of the present invention allow for high levels of inclusions while maintaining high SAG content in the baked cereal product, even where the inclusions themselves have little or no SAG content. For example, fruit may have little or no SAG content.

Additional Components

Cereal products of some embodiments may also include ingredients such as emulsifiers, buffering agents, leavening agents, seasoning, preservatives and sweeteners.

Suitable emulsifiers may include but are not limited to lecithin, diacetyl tartaric ester of monoglyceride ("DATEM"), mono or diglycerides, phospholipids, caseinate, egg whites, sodium stearoyl lactylate and combinations thereof. In one embodiment, a cereal product includes lecithin and DATEM. In one embodiment, the emulsifiers of the cereal product include about 90 wt % lecithin and about 10 wt % DATEM as a percentage of the total weight of emulsifiers in the pre-baked product. In one embodiment, the emulsifiers of the cereal product include about 88 wt % lecithin and about 12 wt % DATEM as a percentage of the total weight of emulsifiers in the pre-baked product. In one embodiment, the emulsifiers of the cereal product include about 60 wt % lecithin and about 40 wt % DATEM as a percentage of the total weight of emulsifiers in the pre-baked product. In one embodiment, the emulsifiers of the cereal product include about 50 wt % lecithin and about 50 wt % caseinate as a percentage of the total weight of emulsifiers in the pre-baked product.

Suitable leavening agents may include but are not limited to ammonium bicarbonate, sodium bicarbonate, sodium acid pyrophosphate or mixtures thereof. In one embodiment, a cereal product includes a combination of ammonium bicarbonate, sodium bicarbonate, and sodium acid pyrophosphate. In another embodiment, a cereal product includes a combination of sodium bicarbonate and sodium acid pyrophosphate. In one embodiment, the leavening agents of the cereal product include about 12 wt % sodium acid pyrophosphate, about 38 wt % ammonium bicarbonate, and about 50 wt % sodium bicarbonate as a percentage of the total weight of leavening agents in the pre-baked product. In one embodiment, the leavening agents of the cereal product include about 40 wt % sodium acid pyrophosphate and about 60 wt % sodium bicarbonate as a percentage of the total weight of leavening agents in the pre-baked product. In one embodiment, the leavening agents of the cereal product include about 100 wt % sodium bicarbonate as a percentage of the total weight of leavening agents in the pre-baked product. In one embodiment, the leavening agents of the cereal product include about 20 wt % ammonium bicarbonate and about 80 wt % sodium bicarbonate as a percentage of the total weight of leavening agents in the pre-baked product.

Additional ingredients may include vitamins or minerals such as vitamin B1, B2, B3, B6, B12, iron, magnesium, calcium or mixtures thereof. Cereal products may also include salt, flavoring agents such as vanilla, cocoa powder, milk and dairy derivatives, honey.

Dough Rheology

In some embodiments, dough is formulated to have a desired rheology, resulting in characteristics beneficial for processing and resulting in the desired final product properties. In some embodiments, the dough has a pre-baked density of from about 1.0 to about 1.5 g/cm$^3$; from about 1.1 to about 1.4 g/cm$^3$; or from about 1.2 to about 1.3 g/cm$^3$. That is, in some embodiments, the combination of ingredients is such that when pressed into the form of a desired pre-baked cereal product shape, the dough has a density of from about 1.0 to about 1.5 g/cm$^3$. In some embodiments, the combination of ingredients in a dough having a density of from about 1.0 to about 1.5 g/cm$^3$, and/or the rheology and particle size properties described below, includes refined wheat flour made of specifically selected milling fractions such that the flour has a very low water absorption, under 55%, as measured by Brabender® Farinograph® according to NF-ISO-5530-1 norm. This density may provide cohesion to the dough that leads to a final product with a desirable texture and strength. When the density of the dough is lower, the texture of the cereal product may be softer and the cereal product may be less able to form a cohesive structure and may be more prone to damage in transit. When the density of the dough is higher, such as from about 1.3 to about 1.5 g/cm$^3$, it may be possible to employ less fat in the dough and still obtain a coherent cereal product. However, as the density of the cereal product increases, it may be overly hard and less desirable to the consumer. In some embodiments, the dough density before moulding is about 0.7 g/cm$^3$.

The compression may be quantified by calculating the density, i.e. the mass per unit volume, of the dough in the rotary mould. This is done by dividing the weight of a dough piece (straight after rotary moulding) by the volume of the rotary mould. In some embodiments, the density of dough after compression in the rotary mould is preferably between about 1.2 and about 1.3 g/cm$^3$.

In some embodiments, the dough preferably has a particle size distribution such that at least about 20 wt %; about 30 wt %; about 50 wt %; or about 70 wt % of the dough passes through a vibrating sieve mesh of 10 mm. In some embodiments, the dough preferably has a particle size distribution such that at least about 8 wt %; at least about 10 wt %; or at least about 15 wt % of the dough passes through a vibrating sieve mesh of 2 mm. The particle size distribution can preferably be determined using five graded sieves having meshes of 10, 8, 6.3, 4 and 2 mm, wherein the sieves are vibrated with a sieve acceleration of about 1.5 mm/"g" for a duration of 3 minutes. The value "g" is the standard gravity constant (g=9.81 m·s$^{-2}$). A suitable machine for performing the sieving is a Vibratory Sieve Shaker AS 200 Control (RETSCH, Germany) and the various test parameters and units are well known in the art. A sample size for performing the analysis is preferably about 800 g.

In some embodiments, the dough has a particle size distribution such that the D10 of the dough mass distribution is at most about 6 mm, preferably at most about 3 mm. This is measured by calculating the cumulated particle size distribution against the mesh size and taking the mesh size value that corresponds to 90% of the dough distribution.

In some embodiments, the dough requires a pressure of at least about 5000 kg/m$^2$ to be compressed to a density of about 1.22 g/cm$^3$. In some embodiments, the pressure required to compress the dough to a density of about 1.22 g/cm$^3$ is from about 6500 to about 30000 kg/m$^2$; or from about 7500 to about 15000 kg/m$^2$. The pressure required to compress the dough is preferably measured using a cylindrical pot having a diameter of about 5.2 cm, wherein about 100 g of dough is introduced into the pot and the dough is compressed into the pot by a circular plate having a diameter of about 5 cm and connected to a force-meter, and wherein the circular plate advances at a rate of about 0.7 mm/s, wherein the force required to achieve a calculated density of about 1.22 g/cm$^3$ is recorded. The force is then converted into a pressure value by dividing by the surface of the plate.

Filling

Cereal products of the present invention may also include a filling, for example, to create a cereal product with a layer of filling or a sandwich snack. Any suitable filling may be included, such as sweet or savory fillings. In some embodiments, suitable fillers may be fat or sugar based. In some embodiments, a suitable filling is formulated to provide the desired nutritional, textural and/or flavor properties for the sandwich cereal snack. A filling may be added to the cereal product in any suitable manner, and in some embodiments, the filling is added after baking the cereal product.

In some embodiments, a suitable filling comprises about 20 wt % to about 40 wt % shortening and about 60 wt % to about 80 wt % sugar. In some embodiments, a suitable filling includes starch. In some embodiments, a sandwich cereal snack includes about 20 wt % to about 40 wt % filling; about 25 wt % to about 35 wt % filling; about 28 wt % to about 30 wt % filling; about 20 wt % filling; about 25 wt % filling; about 28 wt % filling; about 30 wt % filling; about 35 wt % filling; or about 40 wt % filling.

Preparation

Cereal products of some embodiments of the present invention may be prepared according to conditions suitable for achieving the desired levels of SAG in the finished cereal product. In some embodiments, higher SAG content is achieved by using low shear processing conditions. In some embodiments, processing conditions are chosen to minimize damage to the starch in the cereal product formulation.

In some embodiments, ingredients are mixed to prepare a dough. In certain embodiments, ingredients are mixed at low speeds, for example in a double arm mixer, in order to prevent damage to the starch in the formulation. In some embodiments, ingredients of a cereal product formulation are mixed in an order which may help maintain a higher SAG content in the baked cereal product. For example, in some embodiments, water is mixed with fats, sweeteners and emulsifiers to create an emulsion before mixing in the grains of the formulations, such as flour or flakes. Creation of an emulsion before adding the grains may coat the grains with fats from the emulsion, thereby creating a barrier against water and helping to minimize uniform hydration during forming and gelatinization during baking the cereal product.

In some embodiments, the dough is then rotary moulded to prepare dough pieces. For example, rotary moulding may allow the addition of less water to a dough than sheeting. Rotary moulding may be possible with a drier dough than sheeting, and may require different dough elasticity and rheology. Additionally, rotary moulding may result in less starch damage and starch gelatinization than high shear extrusion typically used to produce snacks. Rotary moulding generally does not involve the high pressure and temperatures associated with extrusion. Rotary moulding may aid with maintaining a high SAG content in the baked cereal product. During rotary moulding, in some embodiments, a relatively dry dough with no or minimum gluten development is fed to the hopper and then formed using rotary moulder to produce dough pieces of desired shape, form, thickness and piece weight. The pieces may be transferred to the belt conveyer and further to the oven for baking.

Figure 2:
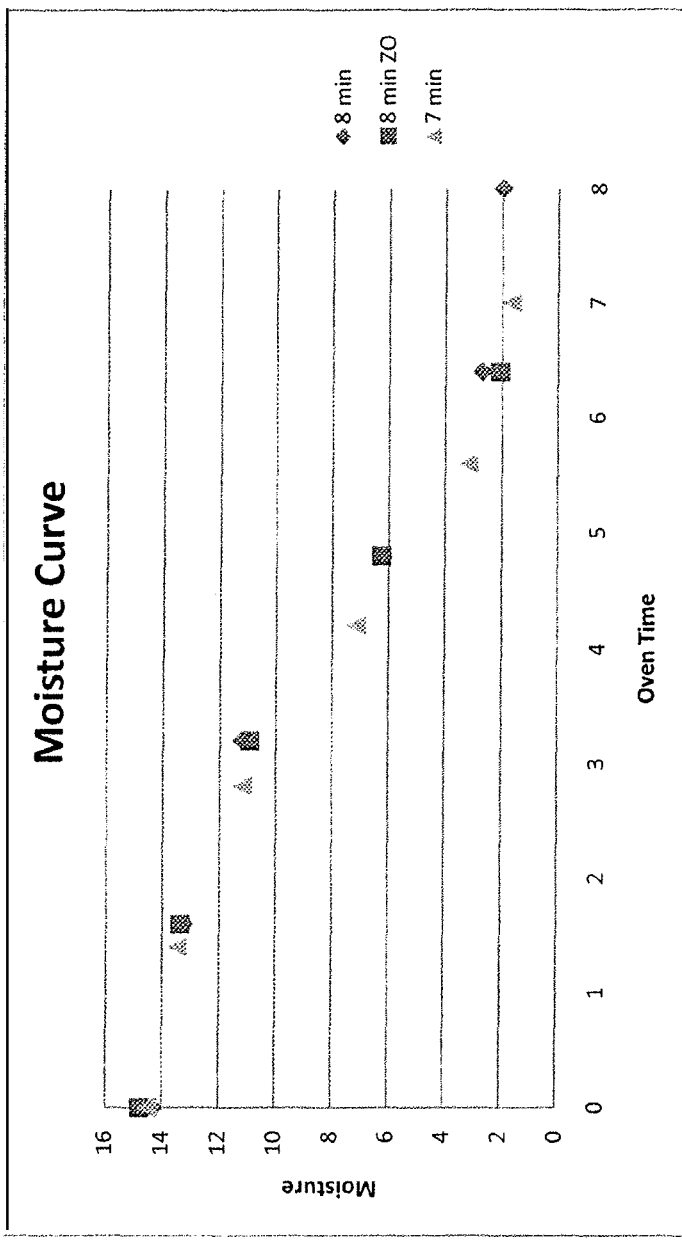
FIG. 2 shows moisture content of an exemplary cereal product during baking, as a function of time.

The formed dough pieces may then be baked. In some embodiments, a cereal product is baked to a desired moisture content. In some embodiments, a baked cereal product has a moisture content of about 0.5 wt % to about 5 wt % of the cereal product; about 1 wt % to about 4 wt % of the cereal product; about 1.5 wt % to about 3 wt % of the cereal product; about 0.5 wt % of the cereal product; about 1 wt % of the cereal product; about 1.5 wt % of the cereal product; about 2 wt % of the cereal product; about 2.5 wt % of the cereal product; about 3 wt % of the cereal product; about 3.5 wt % of the cereal product; about 4 wt % of the cereal product; about 4.5 wt % of the cereal product; or about 5 wt % of the cereal product. FIG. 1 shows moisture content of an exemplary cereal product during baking, as a function of oven length. FIG. 2 shows moisture content of an exemplary cereal product during baking, as a function of time.

Figure 3:
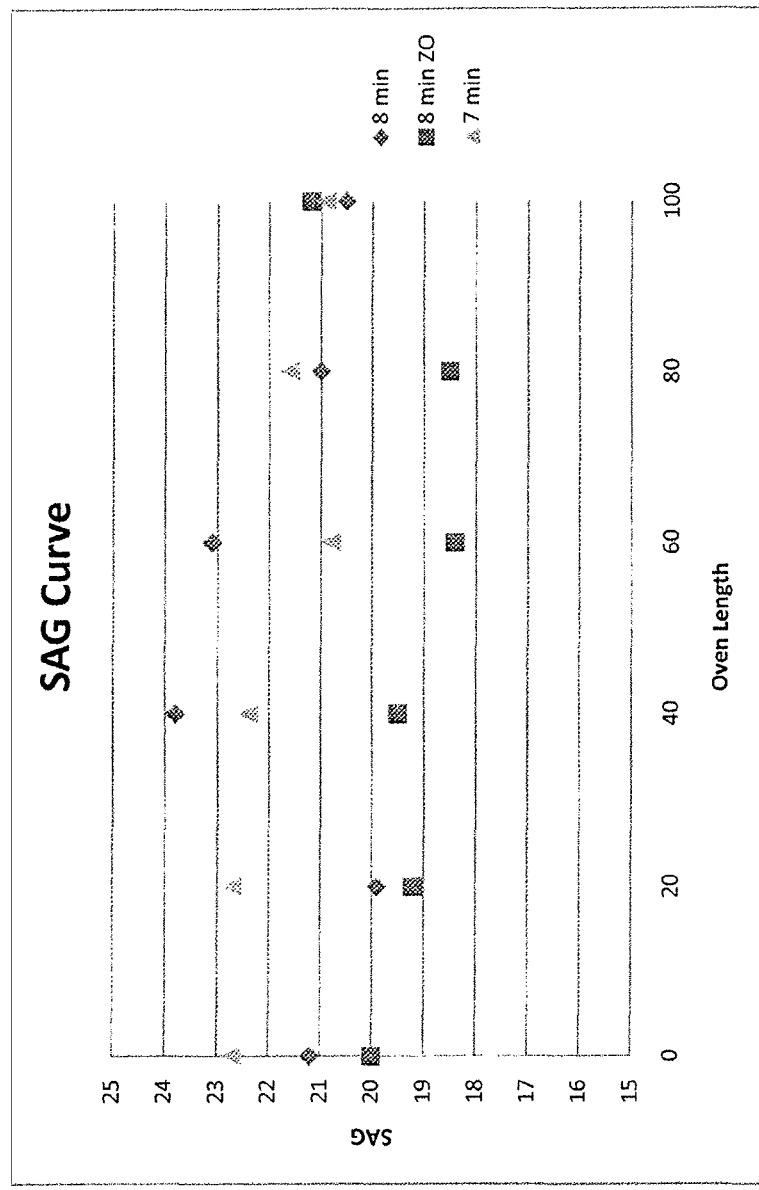
FIG. 3 shows an SAG content in an exemplary cereal product during baking as a function of oven length.
Figure 4:
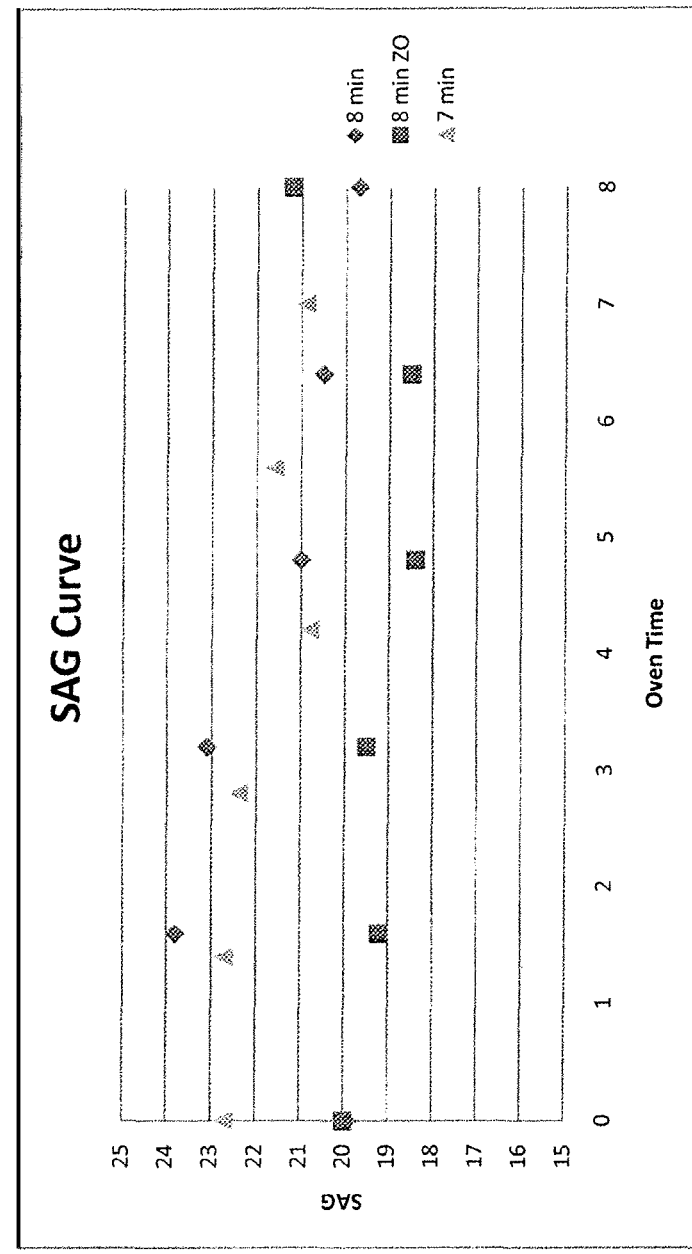
FIG. 4 shows an SAG content of an exemplary cereal product during baking as a function of time.

In some embodiments, the dough pieces are baked according to a temperature profile which helps maintain high SAG content in the baked cereal product. In some embodiments, a dough piece is baked such that an internal temperature of the dough piece remains below the gelatinization temperature of the starch in the dough piece. In some embodiments, a dough piece is baked such that an internal temperature of the dough piece remains below about 100° C. during an initial baking stage. In some embodiments, an initial baking stage is about 10 minutes; about 8 minutes; about 5 minutes; about 3 minutes; about 2 minutes; or about 1 minute. A bake profile including an initial stage wherein the internal temperature of the cereal product remains below 100° C. may prevent gelatinization of the starch in the cereal product, and therefore result in higher SAG content in the baked cereal product. FIG. 3 shows an SAG content in an exemplary cereal product during baking as a function of oven length. FIG. 4 shows an

| Zone | Zone 1 | Zone 2 | Zone 3 | Zone 4 | Zone 5 | Zone 6 | Zone 7 | Zone 8 | Zone 9 |
|---|---|---|---|---|---|---|---|---|---|
| Temperature in Oven [C.] | 104 | 104 | 116 | 135 | 193 | 193 | 188 | 177 | 171 |
| Length of Oven [ft] | 33 | 66 | 99 | 132 | 165 | 198 | 231 | 264 | 304 |
| Length of Zone [ft] | 33 | 33 | 33 | 33 | 33 | 33 | 33 | 33 | 40 |
| % of Oven | 11% | 22% | 33% | 43% | 54% | 65% | 76% | 87% | 100% |
| Time Bake [min] | 0.9 | 1.7 | 2.6 | 3.5 | 4.3 | 5.2 | 6.1 | 6.9 | 8.0 |
| Temperature in Product [C.] | 57 | 66 | 78 | 89 | 116 | 128 | 132 | 137 | 125 |

SAG content of an exemplary cereal product during baking as a function of time.

In some embodiments, an oven temperature may range from about 200° C. to about 300° C., or about 100° C. to about 220° C. during baking. Various types of ovens can be adjusted to processing conditions required to produce a cereal product with desired SAG content. An example of processing conditions in a hybrid (a combination of direct gas fire and forced air convection) oven is below:

In some embodiment, the airflows in the oven may be adjusted to bake a product with desired color and moisture level. Internal product temperature during baking may be measured, for example, by a thermal profile instrument such as the M.O.L.E by ECD®.

In some embodiments, a cereal product may be coated and/or seasoned. In some embodiments, a filling may be added to the cereal product. In some embodiments, a cereal product may be cooled and then packaged.

SAG

As described above, SAG content in a baked cereal product may be dependent on the formulation as well as the conditions of preparing the cereal product.

As described above, SAG refers to the amount of glucose (from starch, including maltodextrins) likely to be available for slow absorption in the human small intestine. Rapidly available glucose (RAG) refers to the amount of glucose likely to be available for rapid absorption in the human small intestine. In the Englyst method, food product samples, such as biscuits, are prepared by manually and roughly grinding one or more representative samples of biscuits or reducing biscuits to particulates by an action simulating chewing. The food product samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labeled RAG. After an enzymatic digestion time of 120 min, glucose is again measured and is labeled available glucose (AV). SAG is obtained by subtracting RAG from AV (SAG=AV−RAG), thus, SAG corresponds to the glucose fraction released between the 20th and the 120th minute. Free glucose (FG), including the glucose released from sucrose, is obtained by separate analysis. Rapidly digestible starch ("RDS") is then obtained as the subtraction of FG from RAG (RDS=RAG−FG).

In some embodiments, a cereal product of the present invention includes a pre-baked SAG in an amount of about 5 g or greater per 100 g of the pre-baked cereal product; about 10 g or greater per 100 g of the pre-baked cereal product; about 15 g or greater per 100 g of the pre-baked cereal product; about 15.8 g or greater per 100 g of the pre-baked cereal product; about 16 g or greater per 100 g of the pre-baked cereal product; about 17 g or greater per 100 g of the pre-baked cereal product; about 18 g or greater per 100 g of the pre-baked cereal product; about 19 g or greater per 100 g of the pre-baked cereal product; about 20 g or greater per 100 g of the pre-baked cereal product; about 21 g or greater per 100 g of the pre-baked cereal product; about 22 g or greater per 100 g of the pre-baked cereal product; about 23 g or greater per 100 g of the pre-baked cereal product; about 24 g or greater per 100 g of the pre-baked cereal product; about 25 g or greater per 100 g of the pre-baked cereal product; about 26 g or greater per 100 g of the pre-baked cereal product; about 27 g or greater per 100 g of the pre-baked cereal product; about 28 g or greater per 100 g of the pre-baked cereal product; about 29 g or greater per 100 g of the pre-baked cereal product; about 30 g or greater per 100 g of the pre-baked cereal product; about 31 g or greater per 100 g of the pre-baked cereal product; about 32 g or greater per 100 g of the pre-baked cereal product; about 33 g or greater per 100 g of the pre-baked cereal product; about 34 g or greater per 100 g of the pre-baked cereal product; about 35 g or greater per 100 g of the pre-baked cereal product; about 35 g or greater per 100 g of the pre-baked cereal product; about 37 g per 100 g of the pre-baked cereal product; about 38 g per 100 g of the pre-baked cereal product; about 39 g per 100 g of the pre-baked cereal product; about 40 g per 100 g of the pre-baked cereal product.

In some embodiments, a cereal product of the present invention includes a post-baked SAG in an amount of about 5 g or greater per 100 g of the cereal product; about 10 g or greater per 100 g of the cereal product; about 15 g or greater per 100 g of the cereal product; about 15.8 g or greater per 100 g of the cereal product; about 16 g or greater per 100 g of the cereal product; about 17 g or greater per 100 g of the cereal product; about 18 g or greater per 100 g of the cereal product; about 19 g or greater per 100 g of the cereal product; about 20 g or greater per 100 g of the cereal product; about 21 g or greater per 100 g of the cereal product; about 22 g or greater per 100 g of the cereal product; about 23 g or greater per 100 g of the cereal product; about 24 g or greater per 100 g of the cereal product; about 25 g or greater per 100 g of the cereal product; about 26 g or greater per 100 g of the cereal product; about 27 g or greater per 100 g of the cereal product; about 28 g or greater per 100 g of the cereal product; about 29 g or greater per 100 g of the cereal product; about 30 g or greater per 100 g of the cereal product; about 31 g or greater per 100 g of the cereal product; about 32 g or greater per 100 g of the cereal product; about 33 g or greater per 100 g of the cereal product; about 34 g or greater per 100 g of the cereal product; about 35 g or greater per 100 g of the cereal product; about 35 g or greater per 100 g of the cereal product; about 37 g per 100 g of the cereal product; about 38 g per 100 g of the cereal product; about 39 g per 100 g of the cereal product; about 40 g per 100 g of the cereal product.

In some embodiments, a cereal product of the present invention includes a slowly-digestible-starch-over-total-available-starch ratio (SDS/(SDS+RDS)) of at least about 31 wt %; at least about 35 wt %; at least about 38 wt %; or at least about 40 wt %. Total available starch comprises SDS and RDS. As stated above, SAG may be used interchangeably with SDS herein. A difference between total available starch and total starch is that total available starch does not comprise resistant starch that cannot be digested, i.e. that escapes digestion in the small intestine.

In some embodiments, a pre-baked SAG content is calculated based on the SAG content of each of the ingredients in a formulation and the weight percent of each of the ingredients in the cereal product. In some embodiments, processing conditions for preparing the baked cereal product minimize damage to the starch and starch gelatinization, thereby resulting in a minimal reduction in SAG content from the pre-baked formulation to the post-baked cereal product. In some embodiments, the post-baked SAG content of a cereal product is less than about 50% below the pre-baked SAG; less than about 45% below the pre-baked SAG; less than about 40% below the pre-baked SAG; less than about 35% below the pre-baked SAG; less than about 30% below the pre-baked SAG; less than about 25% below the pre-baked SAG; less than about 24% below the pre-baked SAG; less than about 23% below the pre-baked SAG; less than about 22% below the pre-baked SAG; less than about 21% below the pre-baked SAG; less than about 20% below the pre-baked SAG; less than about 19% below the pre-baked SAG; less than about 18% below the pre-baked SAG; less than about 17% below the pre-baked SAG; less than about 16% below the pre-baked SAG; less than about 15% below the pre-baked SAG; less than about 14% below the pre-baked SAG; less than about 13% below the pre-baked SAG; less than about 12% below the pre-baked SAG; less than about 11% below the pre-baked SAG; less than about 10% below the pre-baked SAG; less than about 9% below the pre-baked SAG; less than about 8% below the pre-baked SAG; less than about 7% below the pre-baked SAG; less than about 6% below the pre-baked SAG; less than about 5% below the pre-baked SAG; less than about 4% below the pre-baked SAG; less than about 3% below the pre-baked SAG; less than about 2% below the pre-baked SAG; less than about 1% below the pre-baked SAG; or is about the same as the pre-baked SAG. In certain embodiments, the post-baked SAG content of a cereal product may be higher than the pre-baked SAG.

In some embodiments, less than about 15 wt % of the starch in the cereal product is gelatinized; less than about 14 wt % of the starch in the cereal product is gelatinized; less than about 13 wt % of the starch in the cereal product is gelatinized; less than about 12 wt % of the starch in the cereal product is gelatinized; less than about 11 wt % of the starch in the cereal product is gelatinized; less than about 10 wt % of the starch in the cereal product is gelatinized; less than about 9 wt % of the starch in the cereal product is gelatinized; less than about 8 wt % of the starch in the cereal product is gelatinized; less than about 7 wt % of the starch in the cereal product is gelatinized; less than about 6 wt % of the starch in the cereal product is gelatinized; less than about 5 wt % of the starch in the cereal product is gelatinized; less than about 4 wt % of the starch in the cereal product is gelatinized; less than about 3 wt % of the starch in the cereal product is gelatinized; less than about 2 wt % of the starch in the cereal product is gelatinized; or less than about 1 wt % of the starch in the cereal product is gelatinized.

In cereal product formulations of some embodiments of the present invention, inclusion of higher levels of flour in relation to flakes may result in higher SAG content in the baked cereal product. In cereal product formulations of some embodiments of the present invention, inclusion of higher levels of refined flour in relation to whole grains or whole grain flour may result in higher SAG content in the baked cereal product. Such results were unexpected, as whole grains and less processed flour, such as whole grain flour, have generally been thought to result in higher SAG content in baked cereal products. In some embodiments, soft wheat flour may result in higher SAG content in baked cereal products than other types of refined flour. It is believed that soft wheat flour sustains less starch damage during milling because of its softer texture.

In some embodiments, use of higher SAG content ingredients such as soft wheat flour may allow for formulations including higher levels of inclusions, whole grains, and other ingredients while still maintaining a desirable SAG content in the baked cereal product. By using ingredients such as the chosen flours which have higher SAG content, the formulation can include low SAG ingredients such as fruit or chocolate chips while still providing a high SAG in the baked product with desirable sensory attributes.

Sensory Characteristics

Cereal products of the present invention may be formulated and/or prepared to include desirable sensory attributes. For example, cereal products of the present invention may be formulated and/or prepared to include a high SAG content, while still maintaining desired nutrition and sensory attributes. Desired nutrition may include particular levels of whole grains, fat, and/or sugar as described herein. Sensory attributes may include textural properties. This combination of high SAG, desirable nutrition, and desirable sensory attributes is unexpected, as products with high SAG values and/or desirable nutrition attributes are often associated with undesirable sensory attributes, such as an overly harder or softer texture.

In some embodiments, sensory attributes are quantified by measuring hardness in bite intensities, crunchiness, crumbliness, granulometry, fat in mouth intensities, lightness, dryness, shortbread, stickiness, and/or melting perceptions of the cereal product, using a sensory test according to the guidelines ISO 13299:2003 "Sensory analysis—Methodology—General guidance for establishing a sensory profile". Such sensory evaluations and have been shown to be reproducible and discriminating. As used herein, hardness in bite is a primary parameter of texture defined according to guidelines ISO 11036:1994 "Sensory analysis—Methodology—Texture profile", evaluated by sensory experts using the technique described in the same guidelines. The intensity of hardness in bite is measured using a unstructured continuous scale from 0 to 60; 0 being labeled 'weak' and 60 being labeled "intense." Reference products used for such scale in the hardness in bite evaluation were as follows: Croissant de Lune, Balsen as a product with a weak hardness in bite; Veritable Petit Beurre, LU as a product with intermediate hardness in bite; and Bastogne, LU as a product with an intense hardness in bite.

In some embodiments, cereal products have a hardness in bite intensity of about 21.5 to about 41 about 25 to about 41; about 26 to about 37.8; about 26.4 to about 37.8; about 35 to about 40; about 25 to about 40; about 21.5 to about 40; about 21.5; about 22; about 25; about 26; about 26.4; about 27.3; about 28; about 30; about 31.4; about 32; about 32.1; about 34; about 34.8; about 36; about 37; about 38; about 40; or about 41. In some embodiments, such hardness in bite intensities are measured for a cereal product at a shelf life of between about 2 weeks to about 6 months; at about 1 month and about 5 months; at about 1 month; at about 2 months; at about 3 months, at about 4 months, at about 5 months; or at about 6 months.

In some embodiments, a cereal product includes an SAG content of at least about 15 g per 100 g of the cereal product and a hardness in bite intensity of about 25 to about 40. In some embodiments, a cereal product includes an SAG content of at least about 15 g per 100 g of the cereal product, a hardness in bite intensity of about 25 to about 40, and whole grains in an amount of at least about 15 wt % of the cereal product. In some embodiments, a cereal product includes an SAG content of at least about 15 g per 100 g of the cereal product, a hardness in bite intensity of about 25 to about 40, about 29 wt % wholegrain cereal flour, about 5 wt % to about 22 wt % fat, and at most about 30 wt % sugar relative to the total weight of the cereal product.

Exemplary Embodiment with Wholegrain Wheat Flour

The information in this section describes one or more embodiments of a cereal product including wholegrain wheat flour. The wholegrain wheat flour may be reconstituted wholegrain wheat flour obtained from a mixture of refined wheat flour, wheat bran and wheat germ. The refined wheat flour in such a mixture may have a water absorption under 55% as measured by Brabender® Farinograph® used in this method. In this latter case, a part of this refined wheat flour is used to reconstitute the wholegrain wheat flour, however this part will be included in the refined wheat flour content of the dough and, at the same time, part of the wholegrain flour content. In such an embodiment, the other wholegrain flour(s) are chosen amongst wholegrain barley flour, wholegrain rye flour, wholegrain spelt flour and mixture thereof.

In certain embodiments, a cereal product includes the wholegrain wheat flour in an amount of at most about 80 wt % wholegrain wheat flour over the total weight of the wholegrain flour; at most about 60 wt %; at most about 50 wt %; or at most about 32 wt %.

In one embodiment, the wholegrain flour comprises four different types of wholegrain flour: wholegrain barley flour, wholegrain rye flour, wholegrain spelt flour and wholegrain wheat flour.

In some embodiments, the wholegrain flour is a multicereal flour, i.e. at least about 20 wt % of the wholegrain flour is not wholegrain wheat flour; at least about 40 wt %; at least about 50 wt %; or at least about 68 wt %.

In one embodiment, the cereal product may further comprise at most about 34.5 wt %; at most about 16 wt %; at most about 11 wt %; or at most about 9 wt % wholegrain cereal flakes over the total weight of the cereal product, for example wholegrain oat flakes or malted wholegrain rye flakes.

In one embodiment, the method for producing a cereal product according to the present invention includes mixing a cereal flour comprising at least two different types of wholegrain cereal flours with at most about 8 wt % added water over the total weight of the dough, with fat and sugar for forming a dough; rotary moulding the dough for shaping the cereal product; baking the cereal product; wherein the cereal flour comprises refined cereal flour, advantageously refined wheat flour, the refined cereal flour representing at least about 14.5 wt % of the dough, preferably at least about 29 wt %, with a water absorption under 55% as measured by Brabender® Farinograph® according to NF-ISO-5530-1 norm, preferably under 52%.

Advantageously, the refined cereal flour represents at most about 40 wt %, preferably at most about 35 wt % of the dough. Use of this type of flour gives the advantage that less water is needed to form the dough and thus limits gelatinization of starch.

In one embodiment, the cereal product includes at least about 29 wt % wholegrain cereal flour, about 5 wt % to about 22 wt % fat, and at most about 30 wt % sugar relative to the total weight of the cereal product, wherein the slowly-digestible-starch-over-total-available-starch ratio of the cereal product is at least about 31 wt %.

The cereal product may take any suitable form, including but not limited to a biscuit, a cookie, a layered cookie, or miniature biscuits. In one embodiment, the method of preparing a cereal product, such as a biscuit, includes:

mixing a cereal flour comprising the wholegrain cereal flour with fat and sugar and with at most about 8 wt % added water relative to the total weight of the dough, to form a dough;

moulding the dough into the shape of a biscuit;

baking the biscuit;

wherein the cereal flour comprises refined cereal flour in an amount of at least about 14.5 wt % of the dough and wherein the refined cereal flour has a water absorption under 55% as measured by Brabender® Farinograph® according to NF-ISO-5530-1 norm.

In one embodiment, mixing is advantageously carried out in a horizontal mixer with double jacket. Mixing phases are adjusted so that water content is controlled. Advantageously, the temperature of the dough is about 15° C. to about 30° C. during mixing.

Wording "added water" means water that is added in addition to the other ingredients. Thus, "added water" does not include water contained in any other ingredients such as cereal flour and fat. Since, in one embodiment, at most about 8 wt % added water are used, preferably at most about 7 wt %, more preferably at most about wt %, rheology of the dough is quite specific. At such low moisture content, no continuous dough is obtained but a stacking of small dough particles, which are not connected and behave like a granular material (similar to sand). Such dough texture resembles that of shortbread or crumble dough. Hence, in some embodiments, dough workability is diminished.

With conventional rotary moulding apparatuses, it may be difficult and sometimes not possible to process such granular dough. Therefore, a new specific rotary moulder was designed for the rotary moulding step for this embodiment.

Figure 5:
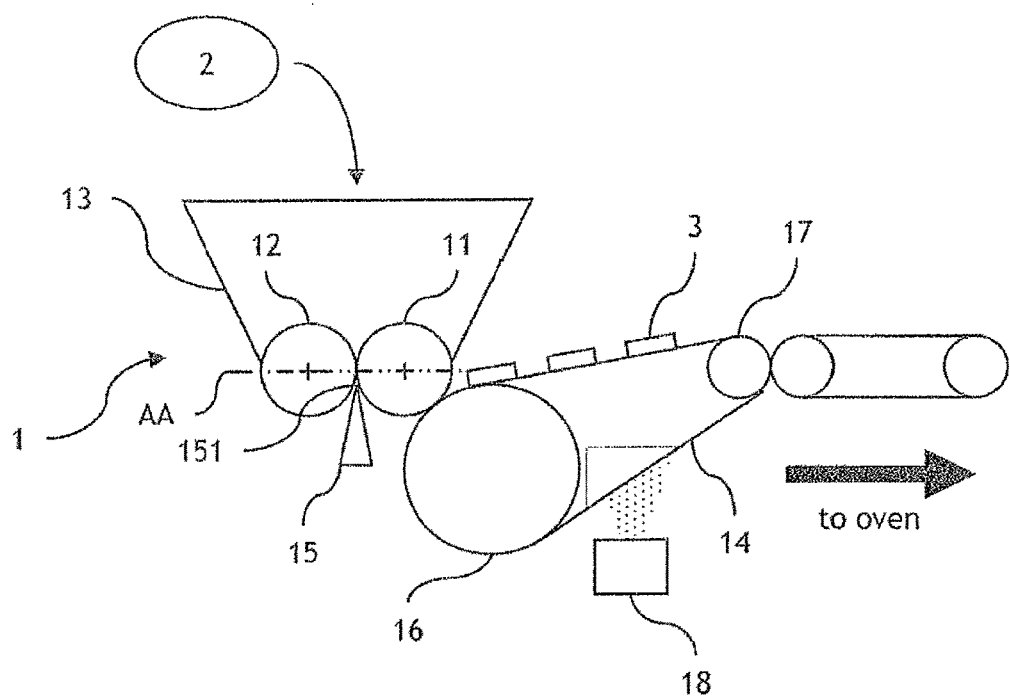
FIG. 5 shows a rotary moulder configuration for use with some embodiments of the present invention.

This specific rotary moulder 1 (as illustrated in FIG. 5) comprises:
- a moulding cylinder 11 and a grooved cylinder 12 for shaping the dough 2 into a biscuit 3;
- a hopper 13 playing the role of a funnel to help feed the moulding and grooved cylinders 11, 12; and
- a demoulding belt 14 for demoulding the biscuit 3.

The moulding cylinder 11 has mould cavities for receiving the dough 2. The mould cavities will give the dough 2 the shape of the biscuits 3. The grooved cylinder 12 comprises grooves of 5 to 15 mm, preferably 10 mm±50% to allow sufficient stickiness of the dough without crushing inclusions like flakes and solid pieces, and during operation presses the dough 2 that is received inside the mould cavities of the moulding cylinder 11 so that the dough completely filled the mould cavities and take the shape thereof. The grooved cylinder 12 is mounted on a horizontal axis and can be adjusted thereon to vary the compression force applied to the dough 2. High compression should be used since the dough 2 lacks continuity, thus, cohesive dough pieces would be demouldable and transferrable from the demoulding belt 14 to the oven belt that drives the uncooked biscuit 3 into the oven for baking.

The difference of speed between the grooved cylinder 12 and the moulding cylinder 11 is maintained less than 10% so that the formation of the biscuit 3 is not impaired. Indeed, a higher differential between both rotation speed of the moulding cylinder 11 and the grooved cylinder 12 will induce a shear strain on the dough that will not be able to be pressed onto the mould cavities but will rather be spread and less packed between the circumferential faces of the moulding cylinder 11 and the grooved cylinder 12.

The level of dough 2 in the hopper 13 can be advantageously controlled so that it is minimal and that the moulding and grooved cylinders 11, 12 are nearly visible. The aim is to prevent the dough from compacting and thus, ensure regular feeding of the moulding cylinder along the width of the belt. The dough has to be the least packed as possible.

A cutter 15, with its tip 151 under the axis line AA of the moulding and grooved cylinders 11, 12, cuts the dough 2 at the top of the mould cavities. The cutter 15 determines the quantity of dough 2 to remain inside the mould cavities, and makes it possible to adjust the weight of the dough pieces therein. Each dough piece forming an uncooked biscuit preferably weighs 0.5 gram to 40 grams, more preferably 1 to 35 grams, still more preferably 1 to 30 grams.

The demoulding belt 14, preferably made from cotton and/or polyamide, has weft with suitable dimension for extracting dough pieces drier than conventional dough, i.e. granular dough. The demoulding belt 14 is mounted on at least two cylinders 16, 17, one of which, generally a rubber cylinder 16, presses the moulding cylinder 11. Upon pressure of the rubber cylinder 16 onto the moulding cylinder 11, the dough pieces lying inside the mould cavities adhere to the demoulding belt 14 and are transported towards the oven for baking.

The rotary moulder 1 may further comprise a humidifier 18 for the demoulding belt 14, for example the humidifier 18 is a steaming device or a water-spraying device.

This rotary moulder 1 can be used for producing other type of biscuits, such as biscuits from a granular dough comprising at least cereal flour and water. A granular dough means a non-cohesive or non-continuous dough like shortbread dough or crumble dough.

Resting time of the dough 2 before forming should be limited to avoid high dryness of the dough 2, which would require to further add water and thus would impede SAG content by triggering starch gelatinization.

Before baking, the biscuits 3 can be glazed so that they gain a shiny appearance. Therefore, the method can comprise an optional additional step of glazing the shaped biscuit 3. The biscuit 3 can be glazed with an aqueous glazing, comprising milk powder and/or icing sugar and/or buffering agent such as sodium bicarbonate, sodium hydroxide. Advantageously, the glazing comprises skimmed milk powder. Still advantageously, the glazing comprises starchy icing sugar, i.e. sucrose natural sweetener characterised by its fine granulometry obtained by milling crystal sugar and added with starch as an anti-agglomerating agent.

Baking is advantageously carried out until the moisture content of the baked biscuit (final product) is about 0.5 wt % to about 5.0 wt %, for example by gentle baking (i.e. baking temperature is below 110° C. inside the biscuit during the first third time of the baking—if baking time is about 7 min, during about 2 min 20 s.—and preferably below 100° C.).

After baking, the baked biscuits are cooled down on an open belt, i.e. a belt that is not covered, a cooling tunnel is preferably not used because there is a too much temperature differential between the input and the output, what causes checking (failure) in the biscuit. The biscuits are then packaged, for example biscuits are packaged into wrappers containing 50 g of biscuits and the wrappers are gathered in a packet that is designed to contain 6, 8 or 12 wrappers. Advantageously, the biscuits can be packaged in wrappers so that one wrapper contains one serving.

Exemplary Embodiment for Layered Cookie

Figure 6:
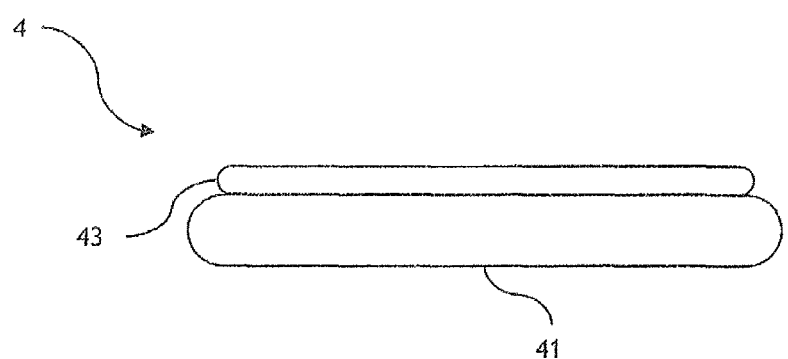
FIG. 6 shows a cereal product with a deposited filling.
Figure 7:
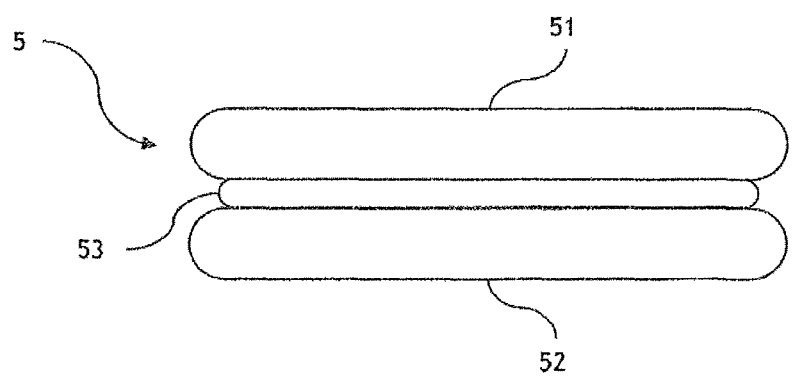
FIG. 7 shows a cereal product in the form of a filled sandwich.

The information in this section describes one or more embodiments of a cereal product including layers of cereal products and filling, such as an open-faced or sandwich cookie. "Layered cookie" will be understood as a cookie made of alternating and successive layers of biscuits and filling. The simplest layered cookie is a cookie 4 with a single base cereal product, such as a biscuit 41, on top of which a filling 43 is deposited as illustrated in FIG. 6. Another type of layered cookie is sandwich cookie 5 which comprises a layer of filling 53 between two layers of cereal products, such as biscuits 51, 52, as illustrated in FIG. 7.

In some embodiments, a layered cookie meets the criteria of providing long-lasting energy and of being a healthy snack. In some embodiments, such layered cookie comprises a biscuit part with at least one biscuit and a filling part, the layered cookie containing about 10 wt % to about 25 wt % fat and about 15 wt % to about 40 wt % sugar. In some embodiments, the layered cookie includes a cereal product part, such as a biscuit, according to the Exemplary Embodiment with Wholegrain Wheat Flour described above.

In some embodiments, the ready-to-eat layered cookie has fat in an amount of about 10 wt % to about 25 wt % of the cookie; about 11 wt % to about 23 wt % of the cookie; about 12 wt % to about 20 wt % of the cookie; or about 15 wt % to about 20 wt % of the cookie. In some embodiments, the biscuit part of the layered cookie contains fat in an amount of about 5 wt % to about 30 wt % of the biscuit part; about 6 wt % to about 22 wt % of the biscuit part; or about 7 wt % to about 15 wt % of the biscuit part.

The layered cookie (i.e. including the filing) obtainable with the method of the disclosure may include sugar in an amount of about 15 wt % to about 40 wt % of the cookie; about 18 wt % to about 36 wt % of the cookie; about 20 wt % to about 32 wt % of the cookie; or about 25 wt % to about 30 wt % of the cookie.

In some embodiments, the healthy layered cookie preferably comprises sugar that makes up to at most about 27.5% of the total caloric value of the final product, fat that makes up to at most about 38.0% of the total caloric value of the final product and available carbohydrate at least about 55.0% of the total caloric value of the final product.

The ready-to-eat layered cookie has a slowly-digestible-starch-over-total-available-starch ratio (SDS/(SDS+RDS)) of at least about 31 wt %; at least about 35 wt %; at least about 38 wt %; or at least about 40 wt %. The highest ratio will preferably be at most 80 wt % for digestibility. Total available starch comprises slowly digestible starch (SDS) and rapidly digestible starch (RDS). Difference between total available starch and total starch is that total available starch does not comprise resistant starch that cannot be digested, i.e. that escapes digestion in the small intestine.

In some embodiments, the ready-to-eat sandwich cookie has at least 15 g SAG/100 g sandwich cookie. This sandwich cookie particularly complies with the long-lasting energy criteria, i.e. SAG value over 15 g/100 g sandwich cookie or slowly-digestible-starch-over-total-available-starch ratio of at least 31% with respect to the total weight of the sandwich cookie.

In some embodiments, the ready-to-eat sandwich cookie has an SAG content of at least about 16.5 g/100 g sandwich cookie; at least about 18.0 g/100 g sandwich cookie; or at least about 21.0 g/100 g sandwich cookie. The highest SAG will preferably be at most about 50.0 g/100 g.

In some embodiments, the filling part is a filling having a consistency that ranges, after cooling, from viscous (for a jam) to a solid (for an anhydrous fat filling). The filling can be water based or fat based. Preferably, the filling has at 40° C. a Casson viscosity between 0.5 Pa·s and 500 Pa·s and a Casson yield stress between 0.1 Pa and 1000 Pa. The Casson yield stress can be measured according to the IOCCC 10/1973:2000 method, and can be measured with any viscometer or rheometer equipped with coaxial cylinders such as for instance MCR300 (Anton Paar Physica) with a TEZ 150-PC and CC27.

Preferably, the filling part contributes about 10 wt % to about 40 wt % of the layered cookie, preferably about 15 wt % to about 32 wt %, more preferably about 25 wt % to about 30 wt %.

The filling part may comprise at least one of the following ingredients: fat sugar, water, starch, emulsifier, milk and dairy derivates, flavouring agents, fruit powder, fruit pieces, cocoa powder, chocolate drops, and seeds.

When the filling part comprises non-gelatinized added starch, non-gelatinized added starch constitutes between about 2.0 wt % to about 40.0 wt % of the filling part; or preferably between about 7.0 to about 22.0 wt % of the filling part.

Emulsifier may be at least one of the following: soya lecithin, diacetyl tartaric ester of monoglyceride, sodium stearyl lactylate. Milk and dairy derivates may be whey powder, yoghurt powder (with living ferments), fresh milk, milk powder, sweet whey powder, milk proteins, whey proteins. Flavouring agent may be in a solid or liquid form. Fruit powder is desiccated fruits that are pulverised such as strawberry, raspberry, raisin, fig, prune, orange, cranberry, blueberry, apricot, blackcurrant, redcurrant, peach, pear, kiwi, banana, apple, lemon, pineapple, tomato.

The biscuit section may be prepared as described in the present disclosure, such as in the Exemplary Embodiment with Wholegrain Wheat Flour, above. In one embodiment, after baking, the baked biscuits are cooled down on an open belt, i.e. a belt that is not covered, a cooling tunnel is preferably not used because there is a too big temperature differential between the input and the output, what causes checking (failure) on the biscuit 3. Then, the filling is deposited on one biscuit (on the base biscuit for a filling-over-biscuit cookie or on one biscuit out of two for a sandwich cookie).

The following examples, wherein all parts, percentages, and ratios are by weight, and all temperatures are in ° F. unless indicated to the contrary, illustrate some embodiments of the present invention:

EXAMPLES

Example 1

Cereal products were prepared according to the following formulations:

| Ingredients | 1<br>% Dough | 2<br>% Dough | 3<br>% Dough |
| --- | --- | --- | --- |
| Water | 3.73 | 3.73 | 3.73 |
| Soft Wheat Flour | 26.62 | 34.61 | 26.62 |
| Whole Wheat Soft Flour | 0.00 | 0.00 | 8.00 |
| Sweeteners | 19.26 | 19.26 | 19.26 |
| Vitamin Premix-Powder | 0.01 | 0.01 | 0.01 |
| Multigrain Blend including flakes | 34.98 | 27.00 | 27.00 |
| Leavening Agent | 1.12 | 1.12 | 1.12 |
| Salt | 0.52 | 0.52 | 0.52 |
| Emulsifiers | 0.45 | 0.45 | 0.45 |
| Shortening/Oil | 13.31 | 13.31 | 13.31 |
| Total | 100 | 100 | 100 |
| Calculated pre-baked SAG (g/100 g) | 17.15 | 20.00 | 19.65 |
| Measured post-baked SAG (g/100 g) | 17.8 | 19.9 | 20.4 |

Pre-baked SAG content of the formulations were calculated based on the known SAG content of the pre-baked components and the amount of the pre-baked component in each formulation. The formulations show that the post-baked SAG content are within a close range of the pre-baked SAG contents.

The formulations show that soft flour allows inclusion of higher levels of flakes, providing a desirable multigrain texture and appearance while maintaining high SAG values.

Example 2

Cereal products were prepared according to the following formulations:
Multigrain Fruit:

| Ingredients | % Dough | % Dough |
| --- | --- | --- |
| Water | 3.66% | 3.66% |
| Soft Wheat Flour | 26.08% | 24.08% |
| Whole Grain Soft Wheat Flour | 0.00% | 8.00% |
| Sweeteners | 18.43% | 18.43% |
| Dried Fruit | 5.94% | 5.94% |
| Flavoring Agent | 0.33% | 0.33% |

-continued

| Ingredients | % Dough | % Dough |
|---|---|---|
| Vitamin Premix-Powder | 0.01% | 0.01% |
| Multigrain Blend including flakes | 30.71% | 24.71% |
| Leavening Agent | 1.10% | 1.10% |
| Salt | 0.59% | 0.59% |
| Emulsifiers | 0.44% | 0.44% |
| Shortening/Oil | 13.04% | 13.04% |
|  | 100% | 100% |
| Calculated pre-baked SAG (g/100 g) | 16.34 | 18.14 |
| Measured post-baked SAG (g/100 g) | 15.60 | 19 |

Chocolate Chip:

| Ingredients | % Dough |
|---|---|
| Water | 7.70% |
| Flavor | 0.96% |
| Soft Wheat Flour | 20.41% |
| Whole Grain Soft Flour | 21.24% |
| Oats | 7.91% |
| Rye Flour | 7.08% |
| Sweeteners | 14.83% |
| Shortening/Oil | 10.87% |
| Chocolate Chips | 7.62% |
| Salt | 0.24% |
| Emulsifiers | 0.20% |
| Color | 0.07% |
| Vitamin Premix-Powder | 0.01% |
| Leavening Agent | 0.84% |
|  | 100.00% |
| Calculated pre-baked SAG (g/100 g) | 24.09 |
| Measured post-baked SAG (g/100 g) | 21.70 |

Pre-baked SAG content of the formulations were calculated based on the known SAG content of the pre-baked components and the amount of the pre-baked component in each formulation. The formulations show that the post-baked SAG content are within a close range of the pre-baked SAG contents.

These formulations demonstrate that inclusion of soft wheat flour allows the use of inclusions. By using ingredients such as the chosen flours which have higher SAG content, the formulation can include low SAG ingredients such as fruit or chocolate chips while still providing a high SAG in the baked product.

Example 3

A plain Cocoa biscuit was prepared. The biscuit has the following composition (in percentage of the final biscuit):

| dough ingredients | 115.41 wt % |
|---|---|
| glazing ingredients | 1.69 wt % |
| water removal | −17.10 wt % |
| total | 100 wt % |

More particularly, biscuits are produced from dough formed with the following formulation:

| Ingredient | Wt % in dough | Wt % in Biscuit |
|---|---|---|
| Refined soft wheat flour | 29.4 | 29.2 |
| Wheat bran and germ | 3.0 | 3.1 |
| Whole grain spelt flour | 0.91 | 0.90 |
| Whole grain rye flour | 2.9 | 2.9 |
| Whole grain barley flour | 5.6 | 5.5 |
| Whole grain oat flakes | 7.7 | 7.8 |
| SUGARS | 16.5 | 19.0 |
| FAT | 10.2 | 11.8 |
| ADDED WATER | 7.6 | 2.0 |
| Cocoa powder | 3.0 | 3.3 |
| Chocolate drop | 11.3 | 13.0 |
| Flavouring powder | 0.27 | 0.31 |
| Emulsifier | 0.33 | 0.38 |
| Salt | 0.25 | 0.29 |
| Leavening agents | 0.80 | 0.18 |
| Vitamin and mineral lend | 0.16 | 0.18 |
| Total | 100.0 | 100.0 |
| Relative total wt % after baking | 86.8 |  |

(amounts are expressed in percentage with respect to the weight of, respectively, final biscuit and unbaked dough)

Wholegrain wheat flour is reconstituted from:

|  | final biscuit | unbaked dough |
|---|---|---|
| refined soft wheat flour | 16.87 wt % | 14.62 wt % |
| wheat bran and germ | 3.45 wt % | 2.99 wt % |
| total wholegrain wheat flour | 20.32 wt % | 17.61 wt %. |

The water absorption measured by Brabender® Farinograph® of the refined wheat flour is 52%.

The ingredients of the dough are mixed together in a horizontal mixer until the dough gets a homogenised consistency. Then the dough is rested for 30 minutes. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| water | 1.48 wt % |
|---|---|
| skimmed milk powder | 0.169 wt % |
| starchy icing sugar | 0.0425 wt %. |

After glazing the biscuits are driven to the oven for baking for about 7 min. During baking the temperature of the dough remains under 160° C. At the end of baking, the water content is about 2.0 wt %.

When the biscuits are taken out from the oven, they are allowed to cool down on open belts until the temperature of the biscuits is below 30° C.

The biscuit comprises 57.15 wt % cereal ingredients, more in particular 31.19 wt % wholegrain cereal flour representing 64.55% of the total cereal flour. The biscuit has 17.1 wt % fat and 27.1 wt % sugar. Fat represents 35% of the total caloric value of the biscuit, while carbohydrate represents 58% and more precisely, sugar represents 24%. The biscuit has a SDS/(RDS+SDS) ratio of 40.75% and 16.3 g SAG/100 g biscuit. The biscuit has a starch content of 36.5 wt %.

Example 4

The biscuit has the following composition (in percentage of the final biscuit):

| | |
|---|---|
| dough ingredients | 112.46 wt % |
| glazing ingredients | 1.69 wt % |
| water removal | −14.15 wt % |
| total | 100 wt % |

More particularly, biscuits are produced from dough formed with the following formulations:

| Ingredient | Wt % in dough | Wt % in Biscuit |
|---|---|---|
| Refined soft wheat flour | 32.3 | 31.1 |
| Wheat bran and germ | 3.1 | 3.1 |
| Whole grain spelt flour | 0.89 | 0.86 |
| Whole grain rye flour | 3.1 | 3.0 |
| Whole grain barley flour | 4.4 | 4.2 |
| Whole grain oat flakes | 9.5 | 9.5 |
| SUGARS | 16.6 | 18.6 |
| FAT | 12.2 | 13.6 |
| ADDED WATER | 4.5 | 1.5 |
| Honey (dry) | 4.5 | 4.9 |
| Chocolate drop | 7.7 | 8.6 |
| Flavouring powder | 0.29 | 0.32 |
| Emulsifier | 0.15 | 0.17 |
| Salt | 0.26 | 0.29 |
| Leavening agents | 0.44 | 0.10 |
| Vitamin and mineral lend | 0.15 | 0.17 |
| Total | 100.00 | 100.00 |
| Relative total wt % after baking | 89.3 | |

(amounts are expressed in percentage with respect to the weight of, respectively, final biscuit and unbaked dough).

Wholegrain wheat flour is reconstituted from:

| | final biscuit | unbaked dough |
|---|---|---|
| refined soft wheat flour | 16.83 wt % | 14.97 wt % |
| wheat bran and germ | 3.45 wt % | 3.07 wt % |
| total wholegrain wheat flour | 20.28 wt % | 18.04 wt %. |

The water absorption value measured by Brabender® Farinograph® of the refined wheat flour is 53%.

The ingredients of the dough are mixed together in a horizontal mixer until the dough gets a homogenised consistency. Then the dough is rested. After resting, the dough is fed into the hopper of the rotary moulder for forming the biscuits.

The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 1.47 wt % |
| skimmed milk powder | 0.170 wt % |
| starchy icing sugar | 0.040 wt %. |

After glazing the biscuits are driven to the oven for baking for about 7 min. During baking the temperature of the dough remains under 160° C. and the water content decreases until it reaches about 1.5 wt %.

When the biscuits are taken out from the oven, they are allowed to cool down on open belts until the temperature of the biscuits is below 30° C.

The biscuit comprises 56.4 wt % cereal ingredients, more in particular 29.66 wt % wholegrain cereal flour representing 60.34% of the total cereal flour. The biscuit has 17.24 wt % fat and 24.56 wt % sugar. Fat represents 34% of the total caloric value of the biscuit, while carbohydrate represents 60% and more precisely, sugar represents 22%. The biscuit has a SDS/(RDS+SDS) ratio of 44.18% and 18.6 g SAG/100 g biscuit. The biscuit has a starch content of 38.1 wt %.

Example 5

The sandwich cookie has the following composition (in percentage of the final cookie):

| | |
|---|---|
| dough ingredients | 87.12 wt % |
| glazing ingredients | 3.02 wt % |
| filling ingredients | 28.00 wt % |
| water removal | −18.14 wt % |
| total | 100 wt % |

More particularly, the biscuits of the sandwich cookie are produced from dough formed with the following formulations:

| Ingredient | Wt % in dough | Wt % in Biscuit |
|---|---|---|
| Refined soft wheat flour | 48.7 | 49.4 |
| sugar | 16.0 | 18.9 |
| wholegrain cereal flour (rye, barley, spelt) | 3.6 | 3.7 |
| wheat bran and wheat germ | 2.4 | 2.6 |
| oat flakes | 10.5 | 11.0 |
| FAT | 10.1 | 11.9 |
| ADDED WATER | 6.8 | 1.0 |
| Flavouring powder | 0.33 | 0.39 |
| Emulsifier | 0.12 | 0.14 |
| Salt | 0.21 | 0.25 |
| Leavening agents | 0.74 | 0.17 |
| Vitamin and mineral lend | 0.50 | 0.59 |
| Total | 100.00 | 100.00 |
| Relative total wt % after baking | 84.8 | |

(Amounts are expressed in percentage with respect to the weight of, respectively, final biscuit and unbaked dough)

The refined soft wheat flour used in example 5 has a water absorption value as measured with Brabender® Farinograph® of 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.02 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts until the temperature of the biscuits is below 33° C.

The biscuits are then assembled with a filling to form sandwich cookies. The filling has the following composition:

| | |
|---|---|
| sugar | 14.26 wt % |
| wheat starch | 1.93 wt % |
| emulsifier | 0.08 wt % |
| flavouring agent | 0.04 wt % |
| cocoa powder | 4.31 wt % |
| fat | 7.38 wt % |
| total | 28.00 wt %. |

The sandwich cookie has 18.08 wt % fat and 26.5 wt % sugar. Fat represents 35.7% of the total caloric value of the sandwich cookie, while carbohydrate represents 57% and more precisely, sugar represents 23%. The sandwich cookie has a SDS/(RDS+SDS) ratio of 39.95% and 16.5 g SAG/100 g sandwich cookie.

Example 6

Comparative Example

The sandwich cookie for the comparative Example 6 has the following composition (in percentage of the final cookie):

| | |
|---|---|
| dough ingredients | 87.30 wt % |
| glazing ingredients | 3.02 wt % |
| filling ingredients | 28.00 wt % |
| water removal | −18.32 wt % |
| total | 100 wt % |

More particularly, the biscuits of the sandwich cookie are produced from dough formed with the following formulations:

| Ingredient | Wt % in dough | Wt % in Biscuit |
|---|---|---|
| Wheat flour | 47.5 | 49.7 |
| sugar | 15.5 | 18.9 |
| wholegrain cereal flour (rye, barley, spelt) | 3.5 | 3.7 |
| wheat bran and wheat germ | 2.1 | 2.3 |
| oat flakes | 10.2 | 11.0 |
| FAT | 9.8 | 11.9 |
| ADDED WATER | 9.7 | 1.0 |
| Flavouring powder | 0.32 | 0.39 |
| Emulsifier | 0.12 | 0.15 |
| Salt | 0.18 | 0.22 |
| Leavening agents | 0.72 | 0.18 |
| Vitamin and mineral lend | 0.48 | 0.58 |
| Total | 100.00 | 100.00 |
| Relative total wt % after baking | 82.1 | |

(Amounts are expressed in percentage with respect to the weight of, respectively, final biscuit and unbaked dough)

The amount of the various ingredients is actually the same as in example 5, only more water is added into the dough, thus changing the percentage for all ingredients. Another difference is the use of refined wheat flour in example 5, whereas in the comparative example 6, conventional soft wheat flour is used. This soft wheat flour has a water absorption value as measured with Brabender® Farinograph® of 58-59%.

The ingredients of the dough are mixed together in a horizontal mixer until the dough gets a homogenised consistency. Then the dough is rested. After resting, the dough is fed into the hopper of a ordinary rotary moulder for forming the biscuits. The speed differential of the moulding and grooved cylinder is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.02 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts until the temperature of the biscuits is below 33° C.

The biscuits are then assembled with a filling to form sandwich cookies. The filling has the following composition:

| | |
|---|---|
| sugar | 14.26 wt % |
| wheat starch | 1.93 wt % |
| emulsifier | 0.08 wt % |
| flavouring agent | 0.04 wt % |
| cocoa powder | 4.31 wt % |
| fat | 7.38 wt % |
| total | 28.00 wt %. |

This sandwich cookie has 29.7% SDS/(RDS+SDS) and 12.5 g/100 g sandwich cookie of SAG. Thus, SAG content for this sandwich cookie is much less than 15 g/100 g sandwich cookie. This shows that the change in dough formulation and in use of a different rotary moulder result in sandwich cookies with better SAG content.

Also, use of refined wheat flour in example 5 enables diminution of added water content in the dough down to less than 8 wt % of the dough. It is believed that this makes it possible to better protect the starch from gelatinization and therefore preserve a high amount of SAG.

Example 7

The sandwich cookie has the following composition (in percentage of the final cookie):

| | |
|---|---|
| dough ingredients | 87.60 wt % |
| glazing ingredients | 3.01 wt % |
| filling ingredients | 28.00 wt % |
| water removal | −18.62 wt % |
| total | 100 wt % |

More particularly, the biscuits of the sandwich cookie are produced from dough formed with the following formulations:

| Ingredient | Wt % in dough | Wt % in Biscuit |
|---|---|---|
| refined soft wheat flour | 48.7 | 49.6 |
| sugar | 15.9 | 18.9 |

-continued

| Ingredient | Wt % in dough | Wt % in Biscuit |
|---|---|---|
| wholegrain cereal flour (rye, barley, spelt) | 3.6 | 3.6 |
| wheat bran and wheat germ | 2.4 | 2.6 |
| oat flakes | 10.4 | 11.0 |
| FAT | 10.1 | 11.9 |
| ADDED WATER | 7.2 | 1.0 |
| Flavouring powder | 0.33 | 0.39 |
| Emulsifier | 0.12 | 0.14 |
| Salt | 0.21 | 0.25 |
| Leavening agents | 0.76 | 0.18 |
| Vitamin and mineral lend | 0.37 | 0.44 |
| Total | 100.00 | 100.00 |
| Relative total wt % after baking | 84.4 | |

(Amounts are expressed in percentage with respect to the weight of, respectively, final biscuit and unbaked dough.)

The refined soft wheat flour used in example 7 has a water absorption value as measured with Brabender® Farinograph® of 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.01 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts until the temperature of the biscuits is below 33° C.

The biscuits are then assembled with a filling to form sandwich cookies. The filling has the following composition:

| | |
|---|---|
| dairy derivatives (whey, yoghurt) | 4.48 wt % |
| wheat starch | 5.60 wt % |
| sugar | 10.07 wt % |
| emulsifier | 0.07 wt % |
| flavouring agent (yoghurt) | 0.06 wt % |
| acidifying agent | 0.02 wt % |
| fat | 7.70 wt % |
| total | 28.00 wt %. |

The sandwich cookie has 17.62 wt % fat and 28.3 wt % sugar. Fat represents 34.8% of the total caloric value of the sandwich cookie, while carbohydrate represents 59% and more precisely, sugar represents 25%. The sandwich cookie has a SDS/(RDS+SDS) ratio of 43.38% and 19 g SAG/100 g sandwich cookie.

Example 8

Comparative Example

The sandwich cookie for the comparative example 8 has the following composition (in percentage of the final cookie):

| | |
|---|---|
| dough ingredients | 87.80 wt % |
| glazing ingredients | 3.01 wt % |
| filling ingredients | 28.00 wt % |
| water removal | −18.81 wt % |
| total | 100 wt % |

More particularly, the biscuits of the sandwich cookie are produced from dough formed with the following formulations:

| Ingredient | Wt % in dough | Wt % in Biscuit |
|---|---|---|
| wheat flour | 46.8 | 49.4 |
| sugar | 15.4 | 18.9 |
| wholegrain cereal flour (rye, barley, spelt) | 3.5 | 3.6 |
| wheat bran and wheat germ | 2.3 | 2.6 |
| oat flakes | 10.1 | 11.0 |
| FAT (vegetable fat) | 9.7 | 11.9 |
| ADDED WATER | 10.2 | 1.0 |
| Flavouring powder (yoghurt) | 0.31 | 0.38 |
| Emulsifier | 0.12 | 0.15 |
| Salt | 0.20 | 0.25 |
| Leavening agents | 1.02 | 0.25 |
| Vitamin and mineral lend | 0.36 | 0.44 |
| Total | 100.00 | 100.00 |
| Relative total wt % after baking | 81.8 | |

(Amounts are expressed in percentage with respect to the weight of, respectively, final biscuit and unbaked dough.)

The amount of the various ingredients is actually the same as in example 7, only more water is added into the dough, thus changing the percentage for all ingredients. Another difference is the use of refined wheat flour in example 7, whereas in the comparative example 8, conventional soft wheat flour is used. This soft wheat flour has a water absorption value as measured with Brabender® Farinograph® of 58-59%.

The ingredients of the dough are mixed together in a horizontal mixer until the dough gets a homogenised consistency. Then the dough is rested. After resting, the dough is fed into the hopper of a ordinary rotary moulder for forming the biscuits. The speed differential of the moulding and grooved cylinders is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.01 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts until the temperature of the biscuits is below 33° C.

The biscuits are then assembled with a filling to form sandwich cookies. The filling has the following composition:

| | |
|---|---|
| dairy derivatives (whey, yoghurt) | 4.48 wt % |
| wheat starch | 5.60 wt % |
| sugar | 10.07 wt % |
| emulsifier | 0.07 wt % |
| flavouring agent (yoghurt) | 0.06 wt % |
| acidifying agent | 0.02 wt % |
| fat | 7.70 wt % |
| total | 28.00 wt %. |

This sandwich cookie has 28.5% SDS/(RDS+SDS) and 12.3 g/100 g sandwich cookie of SAG. Thus, SAG content for this sandwich cookie is much less than 15 g/100 g sandwich cookie. This shows again that the change in dough formulation and in use of a different rotary moulder result in sandwich cookies with better SAG content.

Also, use of refined wheat flour in example 7 enables diminution of added water content in the dough down to less than 8 wt % of the dough. It is believed that this makes it possible to better protect the starch from gelatinization and therefore preserve a high amount of SDS.

Example 9

The sandwich cookie has the following composition (in percentage of the final cookie):

| | |
|---|---|
| dough ingredients | 90.39 wt % |
| glazing ingredients | 1.90 wt % |
| filling ingredients | 27.00 wt % |
| water removal | −19.29 wt % |
| total | 100 wt % |

More particularly, the biscuits of the sandwich cookie are produced from dough formed with the following formulations:

| Ingredient | Wt % in dough | Wt % in Biscuit |
|---|---|---|
| refined soft wheat flour | 49.5 | 50.9 |
| sugar | 13.9 | 16.7 |
| wholegrain cereal flour (rye, barley, spelt) | 5.8 | 5.9 |
| wheat bran and wheat germ | 2.0 | 2.2 |
| oat flakes | 7.8 | 8.3 |
| FAT (vegetable fat) | 11.0 | 13.2 |
| ADDED WATER | 7.8 | 1.1 |
| Flavouring powder (yoghurt) | 0.23 | 0.27 |
| Emulsifier | 0.29 | 0.35 |
| Salt | 0.20 | 0.24 |
| Leavening agents | 0.75 | 0.18 |
| Vitamin and mineral lend | 0.55 | 0.66 |
| Total | 100.00 | 100.00 |
| Relative total wt % after baking | 83.7 | |

(Amounts are expressed in percentage with respect to the weight of, respectively, final biscuit and unbaked dough)

The water absorption value measured by Brabender® Farinograph® of the refined wheat flour is 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 1.69 wt % |
| skimmed milk powder | 0.17 wt % |
| refined sugar powder | 0.04 wt % |
| total | 1.90 wt %. |

After glazing the biscuits are driven to the oven for baking for about 7 min. During baking the temperature of the dough remains under 160° C. and the water content decreases until it reaches 1.1%.

When the biscuits are taken out from the oven, they are allowed to cool down on open belts until the temperature of the biscuits is below 33° C.

The biscuits are then assembled with a filling to form sandwich cookies. The filling has the following composition:

| | |
|---|---|
| sugar | 16.47 wt % |
| moisturising agent | 6.75 wt % |
| vegetable fat | 1.62 wt % |
| fruit concentrate | 1.35 wt % |
| gums | 0.27 wt % |
| acidity regulator | 0.38 wt % |
| emulsifier | 0.11 wt % |
| flavouring agent (mixed berry) | 0.05 wt % |
| total | 27.00 wt %. |

The sandwich cookie has 12.05 wt % fat and 29.3 wt % sugar. Fat represents 26% of the total caloric value of the sandwich cookie, while carbohydrate represents 68% and more precisely, sugar represents 27.7%. The sandwich cookie has a SDS/(RDS+SDS) ratio of 35.07% and 15.5 g SAG/100 g sandwich cookie.

Unless otherwise stated, the percentage values recited herein are by weight and, where appropriate, by weight of the final biscuit.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention.

We claim:

1. A baked cereal product comprising:
   an SAG content of greater than 15 g per 100 g of the baked cereal product;
   a slowly-digestible-starch-over-total-available-starch ratio (SDS/(SDS+RDS)) of at least about 40%;
   a moisture level of about 4 wt % of the baked cereal product or less;

about 20 wt % to about 80 wt % refined flour; and
starch in an amount of at least about 15 wt % of the weight of the baked cereal product,
wherein the refined flour comprises soft wheat flour,
wherein the starch comprises less than about 15% gelatinized starch,
wherein the refined flour has a water absorption under 55%, as measured according to NF-ISO-5530-1 norm, and
wherein the baked cereal product comprises a hardness in bite intensity of about 25 to about 41, as measured according to ISO 13299 2003 using an unstructured continuous scale from 0 to 60.

2. The baked cereal product of claim 1, wherein the baked cereal product is dough-based.

3. The baked cereal product of claim 1, wherein the baked cereal product has a pre-baked SAG content and a post-baked SAG content, and wherein the post-baked SAG content is less than about 25% below the pre-baked SAG content.

4. The baked cereal product of claim 3, wherein the post-baked SAG content is less than about 10% below the pre-baked SAG content.

5. The baked cereal product of claim 3, wherein the post-baked SAG content is about the same as the pre-baked SAG content.

6. The baked cereal product of claim 1, wherein the baked cereal product has a pre-baked moisture content and a post-baked moisture content, and wherein the pre-baked moisture content is about 18 wt % moisture or less.

7. The baked cereal product of claim 6, wherein the pre-baked moisture content is about 14 wt % or less.

8. The baked cereal product of claim 1, comprising an SAG content of about 15.8 g per 100 g of the baked cereal product.

9. The baked cereal product of claim 1, comprising an SAG content of about 17 g per 100 g of the baked cereal product.

10. The baked cereal product of claim 1, comprising whole grains in an amount of at least about 20 wt % of the baked cereal product.

11. The baked cereal product of claim 1, comprising whole grains in an amount of at least about 30 wt % of the baked cereal product.

12. The baked cereal product according to claim 1, wherein the SAG content of at least 15 g per about 100 g and the gelatinized starch content of less than about 15% are achieved, at least in part, by maintaining an internal temperature below a gelatinization temperature of the starch during baking.

13. The baked cereal product according to claim 2, wherein the dough has a pre-baked density of from about 1.0 to about 1.5 g/cm$^3$.

14. the baked cereal product according to claim 2, wherein the dough has a particle size distribution such that at least about 20 wt % of the dough passes through a vibrating sieve mesh of 10 mm.

15. A baked cereal product comprising
an SAG content of at least 15 g per about 100 g of the baked cereal product;
a slowly-digestible-starch-over-total-available-starch ratio (SDS/(SDS+RDS)) of about 35.1% to about 44.2%;
about 29.2 wt % to about 50.9 wt % refined flour, and
starch in an amount of at least about 15 wt % of the weight of the baked cereal product,
wherein the refined flour comprises soft wheat flour,
wherein the starch comprises less than about 15% gelatinized starch, and
wherein the refined flour has a water absorption under 55%, as measured according to NF-ISO-5530-1 norm.

16. The baked cereal product of claim 15, wherein the baked cereal product is dough-based.

17. The baked cereal product of claim 15, wherein baked cereal product has a pre-baked SAG content and a post-baked SAG content, and wherein the post-baked SAG content is less than about 25% below the pre-baked SAG content.

18. The baked cereal product of claim 17, wherein the post-baked SAG content is less than about 10% below the pre-baked SAG content.

19. The baked cereal product of claim 17, wherein the post-baked SAG content is about the same as the pre-baked SAG content.

20. The baked cereal product of claim 15, wherein the baked cereal product has a pre-baked moisture content and a post-baked moisture content, and wherein the pre-baked moisture content is about 18 wt % moisture or less.

21. The baked cereal product of claim 20, wherein the pre-baked moisture content is about 14 wt % or less.

22. The baked cereal product of claim 15, comprising a hardness in bite intensity of about 26 to about 37.8.

23. The baked cereal product of claim 15, comprising a hardness in bite intensity of about 35 to about 40.

24. The baked cereal product of claim 15, comprising an SAG content of about 15.8 g per 100 g of the baked cereal product.

25. The baked cereal product of claim 15, comprising an SAG content of about 17 g per 100 g of the baked cereal product.

26. The baked cereal product of claim 15, comprising whole grains in an amount of at least about 20 wt % of the baked cereal product.

27. The baked cereal product of claim 15, comprising whole grains in an amount of at least about 30 wt % of the baked cereal product.

28. The baked cereal product according to claim 16, wherein the dough has a pre-baked density of from about 1.0 to about 1.5 g/cm$^3$.

29. The baked cereal product according to claim 16, wherein the dough has a particle size distribution such that at least about 20 wt % of the dough passes through a vibrating sieve mesh of 10 mm.

30. The baked cereal product according to claim 15, wherein the SAG content of at least 15 g per about 100 g and the gelatinized starch content of less than about 15% are achieved, at least in part, by maintaining an internal temperature below a gelatinization temperature of the starch during baking.

31. The baked cereal product according to claim 15, wherein the baked cereal product comprises a hardness in bite intensity of about 25 to about 41, as measured according to ISO 13299 2003 using an unstructured continuous scale from 0 to 60.

32. A baked cereal product comprising:
an SAG content of greater than 15 g per 100 g of the baked cereal product;
a moisture level of about 4 wt % of the baked cereal product or less;
about 20 wt % to about 80 wt % refined flour; and
starch in an amount of at least about 15 wt % of the weight of the baked cereal product,
wherein the refined flour comprises soft wheat flour, wherein the starch comprises less than about 15% gelatinized starch, wherein the refined flour has a water absorption under 55%, as measured according to NF-ISO-5530-1 norm, and wherein the baked cereal product comprises a hardness in bite intensity of about 25 to about 41, as measured according to ISO 13299 2003 using an unstructured continuous scale from 0 to 60.

33. A baked cereal product comprising
an SAG content of at least 15 g per about 100 g of the baked cereal product;
about 20 wt % to about 80 wt % refined flour; and
starch in an amount of at least about 15 wt % of the weight of the baked cereal product,
wherein the refined flour comprises soft wheat flour,
wherein the starch comprises less than about 15% gelatinized starch, and
wherein the refined flour has a water absorption under 55%, as measured according to NF-ISO-5530-1 norm, and
wherein the baked cereal product comprises a hardness in bite intensity of about 21.5 to about 41, as measured according to ISO 13299 2003 using an unstructured continuous scale from 0 to 60.

34. The baked cereal product according to claim 32, wherein the SAG content of at least 15 g per about 100 g and the gelatinized starch content of less than about 15% are achieved, at least in part, by maintaining an internal temperature below a gelatinization temperature of the starch during baking.

35. The baked cereal product according to claim 33, wherein the SAG content of at least 15 g per about 100 g and the gelatinized starch content of less than about 15% are achieved, at least in part, by maintaining an internal temperature below a gelatinization temperature of the starch during baking.

36. The baked cereal product according to claim 32 comprising a slowly-digestible-starch-over-total-available-starch ratio (SDS/(SDS+RDS)) of at least about 31%.

37. The baked cereal product according to claim 33 comprising a slowly-digestible-starch-over-total-available-starch ratio (SDS/(SDS+RDS)) of at least about 31%.

38. A method for preparing a baked cereal product comprising:
(a) preparing a dough comprising grains;
(b) forming the dough to provide a dough piece;
(c) baking the dough piece to provide a baked cereal product, such that the baked cereal product has
a post-baked SAG content of at least about 15 g per about 100 g of the baked cereal product;
a slowly digestible-starch-over-total-available-starch ratios (SDS/(SDS+RDS)) of about 35.1% to about 44.2%;
about 29.2% to about 50.9% refined flour, and
starch in an amount of at least about 15 wt % of the weight of the baked cereal product,
wherein the refined flour comprises soft wheat flour,
wherein the starch comprises less than about 15% gelatinized starch, and
wherein the refined flour has a water absorption under 55%, as measured according to NF-ISO-5530-1 norm.

39. The method of claim 38, wherein the baked cereal product comprises a post-baked SAG content of at least about 15.8 g per about 100 g of the baked cereal product.

40. The method of claim 38, wherein the baked cereal product comprises a post-baked SAG content of at least about 17 g per about 100 g of the baked cereal product.

41. The method of claim 38, wherein the cereal product has a pre-baked SAG content, and wherein the post-baked SAG content is less than about 25% below the pre-baked SAG content.

42. The method of claim 41, wherein the post-baked SAG content is less than about 10% below the pre-baked SAG content.

43. The method of claim 41, wherein the post-baked SAG content is about the same as the pre-baked SAG content.

44. The method of claim 38, wherein the cereal product has a pre-baked moisture content and a post-baked moisture content, and wherein the pre-baked moisture content is about 18 wt % moisture or less and the post-baked moisture content is about 5 wt % moisture or less.

45. The method of claim 44, wherein the pre-baked moisture content is about 14 wt % or less and the post-baked moisture content is about 4 wt % or less.

46. The method of claim 38, wherein the forming the dough to provide a dough piece comprises rotary moulding.

47. The method of claim 38, wherein the dough piece comprises starch, and wherein an internal temperature of the dough piece remains below a gelatinization temperature of the starch during baking.

48. The method of claim 38, wherein an internal temperature of the dough piece is below about 100° C. during an initial baking stage.

49. The method of claim 48, wherein the initial baking stage is about 3 minutes.

50. The method of claim 38, wherein preparing a dough comprises mixing a liquid fat and water to create an emulsion before adding the grains.

51. The method of claim 38, wherein the baked cereal product comprises a moisture level of about 4 wt % of the baked cereal product or less.

52. The method of claim 38, wherein the baked cereal product has a hardness in bite intensity of about 21.5 to about 41, as measured according to ISO 13299 2003 using an unstructured continuous scale from 0 to 60.

53. The method of claim 52, comprising a hardness in bite intensity of about 25 to about 41.

54. The method of claim 52, comprising a hardness in bite intensity of about 26 to about 37.8.

55. The method of claim 52, comprising a hardness in bite intensity of about 35 to about 40.

* * * * *